(12) United States Patent
Brown

(10) Patent No.: US 7,706,671 B2
(45) Date of Patent: Apr. 27, 2010

(54) MULTI-FUNCTION LIQUID CONTAINER

(75) Inventor: Anthony Brown, Hyattsville, MD (US)

(73) Assignee: B2M Asset Management, LLC, Landrum, SC (US)

( * ) Notice: Subject to any disclaimer, the term of this patent is extended or adjusted under 35 U.S.C. 154(b) by 182 days.

(21) Appl. No.: 11/326,563

(22) Filed: Jan. 6, 2006

(65) Prior Publication Data
US 2006/0207986 A1 Sep. 21, 2006

Related U.S. Application Data

(60) Provisional application No. 60/715,567, filed on Sep. 12, 2005, provisional application No. 60/679,976, filed on May 12, 2005, provisional application No. 60/667,770, filed on Apr. 4, 2005, provisional application No. 60/661,910, filed on Mar. 16, 2005.

(51) Int. Cl.
*H05B 1/02* (2006.01)

(52) U.S. Cl. .................. 392/498; 392/441; 219/238; 219/441

(58) Field of Classification Search .................. 219/385, 219/438, 441, 387, 435, 496; 700/266; 704/270; 426/233
See application file for complete search history.

(56) References Cited

U.S. PATENT DOCUMENTS

| | | | |
|---|---|---|---|
| 1,173,989 A | 2/1916 | Thalman et al. | |
| 1,486,802 A | 3/1924 | Royse | |
| 1,938,527 A | 12/1933 | Marelli | |
| 1,954,983 A | 4/1934 | Brown | |
| D95,354 S | 4/1935 | Kircher | |
| 2,093,980 A * | 9/1937 | Linger | 99/285 |
| 2,113,494 A * | 4/1938 | Richmond | 337/390 |
| 2,169,239 A | 8/1939 | Hacmac | |
| 2,624,493 A | 1/1953 | Porter | |
| 2,981,821 A * | 4/1961 | Hayes | 219/441 |
| 3,026,402 A * | 3/1962 | Russell Morris | 219/441 |

(Continued)

FOREIGN PATENT DOCUMENTS

CN 2159731 Y 3/1994

(Continued)

OTHER PUBLICATIONS

Abid, Miraculous Coffee & Tea Maker, Model No. C-50458SG, May 3, 2005.

(Continued)

*Primary Examiner*—Thor S Campbell
(74) *Attorney, Agent, or Firm*—Michael Ries

(57) ABSTRACT

A container is provided for heating or otherwise processing the contents of the container. For example, the container may be a kettle or kettle for heating fluids therein. The container may receive a command, desired characteristic or desired range for processing the contents of the container. The container may further include at least one sensor such as a temperature sensor or pressure sensor for determining a corresponding characteristic of the contents of the container. Based on at least one determined characteristic and/or the input command, the container may heat or otherwise process the contents therein. The results and/or current status of the contents may further be provided through a display. Also, based on the current status of the contents, the container may further process/heat the contents or discontinue processing/heating of the contents.

7 Claims, 8 Drawing Sheets

U.S. PATENT DOCUMENTS

| | | | |
|---|---|---|---|
| 3,269,651 A | 8/1966 | Wilson | |
| 3,552,298 A | 1/1971 | Bufkin et al. | |
| 3,651,405 A | 3/1972 | Whitney et al | |
| 3,681,990 A | 8/1972 | Barrett | |
| 3,693,535 A | 9/1972 | Abel, Jr. | |
| 3,781,521 A | 12/1973 | Kircher | |
| 3,784,788 A * | 1/1974 | Fourny | 219/441 |
| 3,916,818 A * | 11/1975 | Barr et al. | 116/70 |
| 3,934,118 A | 1/1976 | Jorgenson et al. | |
| 3,954,203 A | 5/1976 | Jorgenson et al. | |
| 4,077,690 A | 3/1978 | Koether | |
| 4,111,047 A | 9/1978 | Bailey | |
| 4,142,287 A | 3/1979 | Grabbe | |
| 4,155,349 A | 5/1979 | Hudson | |
| 4,178,957 A | 12/1979 | Hoffman et al. | |
| 4,201,240 A | 5/1980 | Case | |
| 4,206,341 A | 6/1980 | Leuschner et al. | |
| 4,230,731 A | 10/1980 | Tyler | |
| 4,291,576 A | 9/1981 | Deane | |
| 4,300,396 A | 11/1981 | Buckshaw | |
| 4,351,609 A | 9/1982 | Inoue et al. | |
| 4,358,666 A | 11/1982 | Taylor | |
| 4,360,726 A | 11/1982 | Haden | |
| 4,382,176 A * | 5/1983 | Wood | 219/494 |
| 4,385,585 A | 5/1983 | Lebowitz | |
| 4,455,476 A * | 6/1984 | Haden | 392/447 |
| D274,595 S | 7/1984 | Lebowitz | |
| 4,475,024 A | 10/1984 | Tateda | |
| 4,491,251 A | 1/1985 | Pratz et al. | |
| 4,503,320 A | 3/1985 | Polster | |
| 4,509,128 A | 4/1985 | Coppola et al. | |
| 4,544,830 A * | 10/1985 | Miller | 392/447 |
| 4,551,611 A | 11/1985 | Longo | |
| D282,810 S | 3/1986 | Urich | |
| 4,625,553 A | 12/1986 | Charter | |
| 4,636,949 A | 1/1987 | Longabaugh | |
| D288,518 S | 3/1987 | Lebowitz | |
| 4,734,658 A | 3/1988 | Bohan, Jr. | |
| 4,736,329 A | 4/1988 | Ferretti et al. | |
| 4,741,324 A | 5/1988 | Ina et al. | |
| 4,798,939 A * | 1/1989 | Nett | 219/438 |
| 4,813,368 A | 3/1989 | Hutter, III et al. | |
| 4,825,042 A | 4/1989 | Hauslein | |
| 4,833,978 A | 5/1989 | Martone et al. | |
| 4,857,897 A | 8/1989 | Chen | |
| 4,878,297 A | 11/1989 | Vories | |
| 4,913,038 A | 4/1990 | Burkett et al. | |
| D308,315 S | 6/1990 | Ancona et al. | |
| 5,014,611 A | 5/1991 | Illy et al. | |
| 5,021,961 A | 6/1991 | Ross et al. | |
| 5,060,560 A | 10/1991 | VanDeMark | |
| 5,067,474 A | 11/1991 | Chi | |
| 5,132,657 A | 7/1992 | Taylor et al. | |
| 5,135,128 A | 8/1992 | Kuhn | |
| 5,193,139 A | 3/1993 | Schiettecatte | |
| 5,208,896 A | 5/1993 | Katayev | |
| D342,640 S | 12/1993 | Lebowitz | |
| 5,340,019 A | 8/1994 | Bohan, Jr. et al. | |
| 5,372,061 A | 12/1994 | Albert et al. | |
| 5,377,299 A | 12/1994 | Anson et al. | |
| 5,388,501 A | 2/1995 | Hazan et al. | |
| 5,397,031 A | 3/1995 | Jensen | |
| 5,398,597 A * | 3/1995 | Jones et al. | 99/330 |
| 5,402,705 A | 4/1995 | Bailleux et al. | |
| 5,408,579 A | 4/1995 | Hunt | |
| 5,437,002 A | 7/1995 | Bennett | |
| 5,441,039 A | 8/1995 | Yeh | |
| 5,441,344 A | 8/1995 | Cook, III | |
| 5,471,912 A | 12/1995 | Lin | |
| 5,490,449 A | 2/1996 | Meister et al. | |
| 5,490,616 A | 2/1996 | Stowell et al. | |
| 5,508,494 A | 4/1996 | Sarris et al. | |
| 5,549,469 A | 8/1996 | Wild et al. | |
| 5,557,704 A * | 9/1996 | Dennis et al. | 392/480 |
| 5,567,458 A * | 10/1996 | Wu | 426/233 |
| 5,584,229 A | 12/1996 | Anson | |
| 5,588,567 A | 12/1996 | Yeh | |
| 5,606,905 A | 3/1997 | Boehm et al. | |
| 5,642,725 A | 7/1997 | Sharples | |
| 5,724,883 A | 3/1998 | Usherovich | |
| D396,988 S | 8/1998 | Lien | |
| 5,794,520 A | 8/1998 | Hefford | |
| 5,841,108 A | 11/1998 | Lacombe | |
| 5,858,437 A | 1/1999 | Anson | |
| 5,862,738 A | 1/1999 | Warne | |
| 5,895,595 A | 4/1999 | Haden | |
| 5,897,207 A | 4/1999 | Hartmann | |
| 5,905,208 A | 5/1999 | Ortiz et al. | |
| 5,948,304 A * | 9/1999 | Bradenbaugh | 219/496 |
| 5,957,723 A | 9/1999 | Gort-Barten | |
| 6,002,115 A | 12/1999 | McClean | |
| 6,006,959 A | 12/1999 | Naden et al. | |
| 6,013,901 A * | 1/2000 | Lavoie | 219/435 |
| 6,016,836 A | 1/2000 | Brunkhardt | |
| 6,043,467 A * | 3/2000 | Little | 219/542 |
| D427,478 S | 7/2000 | Littmann et al. | |
| 6,082,114 A | 7/2000 | Leonoff | |
| 6,083,543 A | 7/2000 | Kim et al. | |
| 6,109,168 A | 8/2000 | Illy et al. | |
| 6,119,461 A | 9/2000 | Stevick et al. | |
| 6,121,585 A | 9/2000 | Dam | |
| 6,132,782 A | 10/2000 | Burkett et al. | |
| 6,132,853 A | 10/2000 | Noddin | |
| 6,135,010 A | 10/2000 | Husted et al. | |
| 6,171,490 B1 | 1/2001 | Kim | |
| 6,184,487 B1 | 2/2001 | Visscher | |
| 6,220,091 B1 | 4/2001 | Chen et al. | |
| 6,239,712 B1 | 5/2001 | Hawk | |
| 6,282,953 B1 | 9/2001 | Benjey | |
| 6,305,375 B1 | 10/2001 | Brown | |
| 6,339,985 B1 | 1/2002 | Whitney | |
| 6,369,364 B1 | 4/2002 | Oe et al. | |
| 6,380,521 B1 | 4/2002 | Fanzutti | |
| 6,386,136 B1 | 5/2002 | Huff | |
| 6,390,014 B1 | 5/2002 | Ghidini | |
| 6,408,272 B1 | 6/2002 | White et al. | |
| 6,415,707 B1 | 7/2002 | Armstrong | |
| 6,454,127 B1 | 9/2002 | Suomela et al. | |
| 6,460,735 B1 | 10/2002 | Greenwald et al. | |
| 6,471,180 B1 | 10/2002 | Cunningham | |
| 6,472,646 B1 | 10/2002 | Taylor | |
| 6,494,160 B2 | 12/2002 | George | |
| 6,494,161 B1 | 12/2002 | Weiss et al. | |
| 6,513,376 B1 | 2/2003 | Prather et al. | |
| 6,528,768 B1 * | 3/2003 | Simic-Glavaski et al. | 219/438 |
| 6,534,103 B2 * | 3/2003 | Weiss | 426/233 |
| 6,539,842 B1 | 4/2003 | Chapman et al. | |
| 6,540,120 B2 | 4/2003 | Lebowitz | |
| 6,568,848 B1 | 5/2003 | Chapman et al. | |
| 6,571,564 B2 | 6/2003 | Upadhye et al. | |
| 6,573,483 B1 | 6/2003 | DeCobert et al. | |
| 6,578,467 B1 | 6/2003 | Taylor et al. | |
| 6,581,309 B1 | 6/2003 | Conforti | |
| 6,586,710 B2 | 7/2003 | Williamson | |
| 6,588,931 B2 | 7/2003 | Betzner et al. | |
| 6,591,739 B2 | 7/2003 | Norcross | |
| D478,243 S | 8/2003 | Lebowitz | |
| 6,625,910 B2 | 9/2003 | Ching et al. | |
| 6,648,725 B2 | 11/2003 | Chan | |
| D484,735 S | 1/2004 | Lebowitz | |
| 6,705,209 B2 | 3/2004 | Yang et al. | |
| 6,741,180 B2 | 5/2004 | Lassota | |
| D490,639 S | 6/2004 | Kling | |
| 6,742,442 B1 | 6/2004 | Su | |

| | | |
|---|---|---|
| 6,752,875 B2 | 6/2004 | Kiesler et al. |
| 6,759,635 B2 | 7/2004 | Lile |
| 6,762,975 B2 | 7/2004 | Wu |
| D497,511 S | 10/2004 | Lebowitz |
| D498,384 S | 11/2004 | McWilliam |
| 6,811,308 B2 | 11/2004 | Chapman et al. |
| 6,818,867 B2 * | 11/2004 | Kressmann ................. 219/441 |
| 6,829,431 B1 | 12/2004 | Haven et al. |
| 6,837,263 B2 | 1/2005 | Kramer |
| 6,840,802 B2 | 1/2005 | Shepherd |
| 6,857,351 B2 | 2/2005 | Cutter et al. |
| 6,860,192 B2 | 3/2005 | Sharpe |
| 6,860,764 B2 | 3/2005 | Khoury |
| 6,862,932 B2 | 3/2005 | Zimmermann et al. |
| 6,870,135 B2 | 3/2005 | Hamm et al. |
| 6,871,581 B2 | 3/2005 | Suzuki |
| D504,273 S | 4/2005 | Ancona |
| 6,881,055 B2 | 4/2005 | Bird |
| 6,884,971 B2 | 4/2005 | Li |
| 6,899,133 B2 | 5/2005 | Brunkhardt |
| 6,915,070 B1 | 7/2005 | Lee |
| 6,915,732 B2 | 7/2005 | Jones et al. |
| 7,004,360 B2 | 2/2006 | Lebowitz |
| 7,022,946 B2 * | 4/2006 | Sanoner et al. ............. 219/387 |
| 7,038,172 B1 | 5/2006 | Stuck |
| 7,048,144 B1 | 5/2006 | Chan et al. |
| D524,590 S | 7/2006 | Bodum |
| 7,102,107 B1 | 9/2006 | Chapman |
| 7,124,452 B1 | 10/2006 | Bauza |
| RE039,431 E | 12/2006 | Naden et al. |
| 7,174,579 B1 | 2/2007 | Bauza |
| D545,111 S | 6/2007 | Brown |
| 7,257,321 B2 * | 8/2007 | Kaastra ...................... 392/459 |
| 7,301,127 B1 | 11/2007 | Derridinger, Jr. |
| 7,330,101 B2 | 2/2008 | Sekura |
| 2001/0029881 A1 | 10/2001 | George |
| 2002/0086612 A1 | 7/2002 | Chan |
| 2002/0129650 A1 | 9/2002 | Zimmermann et al. |
| 2002/0130137 A1 | 9/2002 | Greenwald et al. |
| 2002/0160629 A1 | 10/2002 | Lau et al. |
| 2002/0166451 A1 | 11/2002 | Rothe et al. |
| 2002/0166454 A1 * | 11/2002 | Weiss et al. ................ 99/323.7 |
| 2003/0026604 A1 | 2/2003 | Hollyday et al. |
| 2003/0146204 A1 | 8/2003 | Kaastra |
| 2003/0159588 A1 | 8/2003 | Croll |
| 2003/0173350 A1 | 9/2003 | Takegoshi |
| 2003/0193835 A1 | 10/2003 | Richardson |
| 2004/0056027 A1 | 3/2004 | Miller |
| 2004/0081732 A1 * | 4/2004 | Weiss ......................... 426/445 |
| 2004/0168684 A1 | 9/2004 | Shapiro et al. |
| 2005/0004712 A1 * | 1/2005 | Stevens et al. ............. 700/266 |
| 2005/0005951 A1 | 1/2005 | Thomas et al. |
| 2005/0016381 A1 | 1/2005 | Chan |
| 2005/0022564 A1 | 2/2005 | Kim et al. |
| 2005/0022847 A1 | 2/2005 | Nito et al. |
| 2005/0025556 A1 | 2/2005 | Guillaume et al. |
| 2005/0117894 A1 | 6/2005 | Khoury |
| 2005/0184048 A1 | 8/2005 | DeCobert et al. |
| 2005/0188854 A1 | 9/2005 | Green et al. |
| 2005/0188855 A1 | 9/2005 | Tang |
| 2005/0247743 A1 | 11/2005 | Loring |
| 2005/0261907 A1 * | 11/2005 | Smolenski et al. .......... 704/270 |
| 2006/0005712 A1 | 1/2006 | Greenwald et al. |
| 2006/0016342 A1 | 1/2006 | Wilson et al. |
| 2006/0016343 A1 | 1/2006 | Tobin et al. |
| 2006/0016834 A1 | 1/2006 | Palm et al. |
| 2006/0043124 A1 | 3/2006 | Naden |
| 2006/0081639 A1 | 4/2006 | Lazaroff et al. |
| 2006/0086256 A1 | 4/2006 | Heinze |
| 2006/0091183 A1 | 5/2006 | Cheng et al. |
| 2006/0117962 A1 | 6/2006 | Hoekstra et al. |
| 2006/0186112 A1 | 8/2006 | Valiyambath Krishnan et al. |
| 2006/0191919 A1 | 8/2006 | Cheu |
| 2006/0243272 A1 | 11/2006 | Chow |
| 2006/0249504 A1 | 11/2006 | Kaney et al. |
| 2006/0283329 A1 | 12/2006 | Ronci |
| 2007/0042091 A1 | 2/2007 | Rund et al. |
| 2007/0175886 A1 | 8/2007 | Barnes et al. |
| 2007/0210061 A1 | 9/2007 | Tynes et al. |
| 2007/0210062 A1 | 9/2007 | Gaynor et al. |
| 2008/0083730 A1 | 4/2008 | Dolgov et al. |
| 2008/0178741 A1 * | 7/2008 | DeMars et al. ................ 99/282 |

FOREIGN PATENT DOCUMENTS

| | | |
|---|---|---|
| DE | 3904859 | 8/1990 |
| DE | 4343919 | 6/1995 |
| DE | 10121444 | 11/2002 |
| DE | 10356251 | 6/2005 |
| EP | 0093366 | 11/1983 |
| EP | 0168985 | 1/1986 |
| EP | 0840099 | 5/1998 |
| EP | 1021979 | 7/2000 |
| EP | 1271061 | 1/2003 |
| EP | 1369674 | 12/2003 |
| EP | 1518483 | 3/2005 |
| EP | 1767128 | 9/2005 |
| EP | 1597989 | 11/2005 |
| EP | 1584273 | 12/2005 |
| GB | 18980 | 6/1904 |
| GB | 625781 | 4/1947 |
| GB | 659658 | 10/1951 |
| GB | 2061091 | 5/1979 |
| GB | 2108809 | 5/1983 |
| GB | 2168521 | 6/1986 |
| GB | 2185161 | 7/1987 |
| GB | 2195446 | 4/1988 |
| GB | 2206277 | 1/1989 |
| GB | 9203171.4 | 6/1992 |
| GB | 2274514 | 7/1994 |
| GB | 2312153 | 10/1997 |
| GB | 2325395 | 11/1998 |
| GB | 2327180 | 1/1999 |
| GB | 2350734 | 6/2000 |
| GB | 2397011 | 7/2004 |
| GB | 2400303 | 10/2004 |
| GB | 2407478 | 4/2005 |
| GB | 2409341 | 6/2005 |
| GB | 2380063 | 3/2006 |
| GB | 2422770 | 9/2006 |
| GB | 2424740 | 10/2006 |
| GB | 2429285 | 2/2007 |
| GB | 2435406 | 8/2007 |
| JP | S64-17616 | 1/1989 |
| JP | 6133852 | 5/1994 |
| JP | 1998262826 | 10/1998 |
| JP | 11211102 | 8/1999 |
| JP | 2000005068 | 1/2000 |
| JP | 2001336986 | 12/2001 |
| JP | 2002233458 | 8/2002 |
| JP | 2004186164 | 7/2004 |
| NZ | 505770 | 8/2002 |
| TW | 0417779 | 1/2001 |
| WO | WO9316333 | 8/1993 |
| WO | WO97/24966 | 7/1997 |
| WO | WO99/48331 | 9/1999 |
| WO | WO0156438 | 2/2000 |
| WO | WO0065967 | 11/2000 |
| WO | WO0128294 | 4/2001 |
| WO | WO01/78566 | 10/2001 |
| WO | WO01/93733 | 12/2001 |
| WO | WO03031876 | 4/2003 |
| WO | WO2004/071258 | 8/2004 |
| WO | WO2005004678 | 1/2005 |
| WO | WO2007007019 | 7/2005 |

| | | |
|---|---|---|
| WO | WO2008052276 | 5/2008 |

OTHER PUBLICATIONS

About, TuiliTEA variable Temperature Tea kettle Review, at coffeetea.about.com/od/teaware/gr/utilitea.htm, 1 page, obtained Aug. 1, 2005.
Adagioteas, UtiliTEA kettle, at www.adagio.com/teaware/utiliTEA_kettle.html?nav=reviews, 3 pages, obtained Aug. 1, 2005.
Alessi, Stainless Steal kettle with Bird Shape Whistle, at www.forzieri.com/usa/product_view.asp?l=usa&c-usa&pf_id=al38473-063&id_valor, 4 pages, obtained Dec. 23, 2004.
Almost Free Energy. Com, Low voltage Electric Hot Water Heater Elements, at www.almostfreeenergy.com/hotwater.html, 2 pages, obtained Jan. 16, 2005.
Amazon.co.uk, Breville JK15 Lightening Illuminating White kettle, Obtained May 3, 2005.
Amazon.com, Alfi Albergo Carafe, Chrome Plated Metal with Plastic Trim integrated Tea Filter, at www.amazon.com/exec/obidos/tg/detail/-/B00008WVAT/qid=1103053071/br=1-14/r..., obtained Dec. 14, 2004.
Amazon.com, Rival 14005WA Beverage Warmer by Rival, at www.amazon.com/o/ASIN/B00006IUXA/002-43155757-7978421?SubscriptionID=0..., 4 pages, obtained Jul. 24, 2005.
Applica, Press releases, at www.hosenholdproductsinc.com/pressroom/DisplayRelease.asp?id=13, 1 page, obtained Dec. 15, 2004.
Banade, Arthur H., Air Column, Reed, and Player's Windway Interaction in Musical Instruments, Reprinted from Vocal Fold Physiology, 1985.
Bed Bath & Beyond, corporate Profile, at www.corporate-ir.net/ireye/ir_site.zhtml?ticker=bbby&script=2100, 1 page, obtained Sep. 17, 2005.
Bodum Ibis Electric Water kettle, at www.baldmountaincoffee.com/page/BMCC/PROD/BODUM_5500_03US, 2 pages, obtained Jul. 25, 2005.
Bosch EnergyStar Axxis Front Loader Washer, product description, at www.compactappliance.com/shopping/product/print/detailprintmain.jsp?itemType=..., obtained Aug. 26, 2005.
Ciao Shopping Intelligence, Breville JK15 LTNG, at www.ciao.co.uk/Breville_JK15_LTNG_5702678, 3 pages, obtained Apr. 28, 2005.
Clifford, Michelle, et al., Altimeter and Barometer System, Freescale Semiconductor, inc., Aug. 2004.
Clifford, Michelle, Water Level Monitoring, Freescale Semiconductor, Application Note, Nov. 2004.
Commercial & Domestic Applicence Repairs—Miele Domestic Tumble Dryers, at www.canddar.co.uk/Miele/MieleDomTD.html, obtained Aug. 26, 2005.
Cooking.com, search for teakettle, at www.cooking.com/products/shprodii.asp?Parsed=True&Keywords=teakettle&c=bp..., 6 pages, obtained Sep. 18, 2005.
Cramer, Variable Temperature Electric Kettle, an industry First, 1 page, obtained Jul. 24, 2005.
CVS/Pharmacy, Home Medical Supplies, Talking Rx, at www.cvs.com/CVSApp/cvs/gateway/detail?prodid=279361, 2 pages, obtained Jul. 16, 2005.
Digital Cookware, Inc. Press Page, at www.digitalcookwareinc.com/Press.htm, obtained Apr. 15, 2005.
Ebay, Electric Tea Kettle with Adjustable Temperature Cup, Item No. 4395479915, 3 pages, obtained Jul. 25, 2005.
Ecopure water filters and distillers, Tiger™ Air Pot, at www.canadashops.com/stores/ecopurewater/c199523p16538878.2.html, 1 page, obtained Jul. 25, 2005.
Eksen, BKK 1108 Tea Kettle, at www.eksen.com/tr/kettle.html, 1 page, obtained Jul. 29, 2005.
Everyjoin International Co., Ltd., at www.semico.globalsources,com/si/6008801674816/everjoin.co, obtained Dec. 22, 2004.
Everything Home, Search for tea kettle, at search.store.yahoo.com/cgi-bin/nsearch?followpro=1&vwcatalog=everythInghome..., 2 pages, obtained Jul. 10, 2005.
Everything Home, Search for tea kettle, at search.store.yahoo.com/cgi-bin/nsearch?query=tea+kettle&first=10&only=0&categ=..., 2 pages, obtained Jul. 10, 2005.
Everything Home, Search for tea kettle, at search.store.yahoo.com/cgi-bin/nsearch?query=tea+kettle&first=20&only=0&categ=..., 2 pages, obtained Jul. 10, 2005.
Everything Home, Search for tea kettle, at search.store.yahoo.com/cgi-bin/nsearch?query=tea+kettle&first=30&only=0&categ=..., 2 pages, obtained Jul. 10, 2005.
Everything Home, Search for tea kettle, at search.store.yahoo.com/cgi-bin/nsearch?query=tea+kettle&first=60&only=0&categ...., 2 pages, obtained Jul. 10, 2005.
Everythinghome, Capresso MT500 10 cup Thermal Coffee Maker, at store.everythinghome.org/capmt10cupth.html, 5 pages, obtained Mar. 5, 2005.
Fenner et al., "Water Vapor Sensor", Sensor magazine, at www.sensorsmag.com/articles/0502/32/main.shtml, May 2002.
Firegear, Single-Function Wireless Remote control System, Installation and Operating Instructions, May 14, 2004.
GE, Electric Kettle, Mar. 11, 2002, pp. 1-16.
Goliath, A Kettle Perfect for Green Tea, Tea & Coffee Trade Journal, Feb. 20, 2005, 2 pages.
Halfbakery, Remote Control Kettle, at www.halfbakery.corn/idea/Remote_20control_20Kettle, obtained Jun. 10, 2005.
Hecht's Gifts, at www.hechts.com/gifts/OnlineShopping/WB?Dsp=3&PCR=14:10012:10079:10969:..., obtained Jun. 26, 2005.
Homeclick, LG XL Electric Dryinter, Model DLE3777W, at www.homeclick.com/showpage.asp?itemid=1838996, obtained Aug. 26, 2005.
HomeRoast Digest, at themeyers.org/HomeRoast/Topic8847.htm, 4 pages, obtained Jul. 29, 2005.
Hot Water level Indicator, by Andy Collinson, at www.zen22142.zen.co.uk/Circuits/Misc/hwtank.htm, 2 pages, obtained Apr. 27, 2005.
HotWatt, Heaters for Every Application, Suggested Watt Densities, at www.hotwatt.corn/watt. Htm, 3 pages, obtained Jan. 22, 2005.
IllyUSA, FrancisFrancis! X1 Espresso Lover's Kit and Gaggia evolution expresso Lover's kit, at www.illyusa.com/AB1666000/webpage.cfm?WebPage_ID=83 and www.illyusa.com/AB1666000/showdetl.cfm?Product_ID=1318, 4 pages, obtained Aug. 28, 2005.
Image Supply, Kitchen Appliances, Electric Kettles, at www.imagesupply.net/astro/Electric_Kettles3485.htm, 8 pages, obtained Jan. 8, 2005.
JCPenney, search for tea kettle, at www3.jcpenney.com/jcp/SearchDepartment.aspx?SearchString=tea+kettle&JSEnabl..., obtained Jul. 10, 2005.
JCPenney, search for tea kettle, at www3.jcpenney.com/jcp/SearchDepartment.aspx?SearchString=tea+kettle&JSEnabl..., obtained Aug. 17, 2005.
Joyce Chen, Traditional Collectoin Japanese Tetsubin (Cast Iron) Teapots, at www.kasbahouse,comaraditionalJapaneseTetsubinCastIronTeapost.asp, 7 pages, obtained Dec. 15, 2004.
Kannegiesser, PowerTrans, at www.kannegiesser-usa.com/powertrans.html, 2 pages, obtained Mar. 5, 2005.
Kannegiesser, The Wetside Story, Undated, obtained 2005.
King's Electrical Co., Ltd., Product information, at www.king-s.com.tw/e-new.htm, 2 pages, obtained Mar. 7, 2005.
Kismet Award Winning Tea Kettle, at goodwoods.safeshopper.com/79/1218.htm?495&OVRAW=electronic%20tea%20ket..., 3 pages, obtained Jun. 14, 2005.
Kitchen & home Gadgets, at www.ekitchengadgets.com/riv40hotpoti.html, obtained Jul. 24, 2005.
Kitchen & home gadgets, Proctor Silex 45802B Hot Pot Blue, at www.ekitchengadgets.com/procsil45hot.html, 1 page, obtained Jul. 25, 2005.
Kmart, search for tea kettle, at www.kmart.com/catalog/search.jsp?NO-0&Ntt-tea+kettle&Ntk=All&Nao=0&Ntx=..., 1 page, obtained Jul. 10, 2005.
Macy's tea kettles, at www.macys.com/search/results.ognc?Action=searchpagination&pageid=2&startpos..., obtained Jun. 26, 2005.

Manual of Naval Prevention medicine: Chapter 1: Food Safety, at www.vnh.org/PreventionMedicine/Chapter1/Section4.html, obtained Aug. 26, 2005.
Market Housewares, Delonghi metropolis Elec KBM1511, at www.markethousewares.com/browseproducts/DeLonghl-Metropolis-Electric-Kettle-K..., 1 page, obtained Jan. 15, 2005.
Micorwaves & More, Panasonic NC-EM30P 3.2- quart Electric Thermo Pot, at www.microwavesandmore.com/panasonic-nc-em30p-features.html, obtained Jan. 15, 2005.
Mississippi State University Extension Service, P2245 Major Applicences have Two Price Tags, obtained Aug. 25, 2005.
Musical Tea Kettle from AU5103185 Jun. 26, 1986, description and claims of GB21288521, obtained Jan. 4, 2005.
National Electric Thermo Pot, NC-ER22N/ER30N, Operating instructions, 42 pages, undated, obtained 2005.
NexTag, Krups Electric Tea Kettle, at www.nextag.com/serv/main/buyer/outpdir.jsp?nxtg=341980_646BEC8EB829C09D&se..., 2 pages, obtained May 3, 2005.
Nielsen J, et al., Stationary Mobility, at useit.corn/alertbox/20010318.html, 3 pages, obtained Aug. 17, 2005.
Optima 850, Electric Quick boiling Kettle 40/60, Jul. 2002.
Philips, Coffeemaker range 2002, obtained Aug. 28, 2005.
Piranha Press Releases, Boiling Water at your Fingertips, at www.piranhaoffroadproducts.com/au/compnay/press_release_detail.htm?id=2, Obtained Jan. 8, 2005.
Plow & Hearth, Speckled Cast Iron Kettle, at www.plowhearth.com/product.asp?pcode=8890, 1 page, obtained Jan. 8, 2005.
Presto 02703 1 Quart Electric Tea kettle, at store.yahoo.com/efendos/pres021quare.htrnl, 1 page, obtained Jan. 5, 2005.
PureTech products, at www.puretechgroup.com/products.php, 24 pages, obtained Jul. 25, 2005.
Pyronics, Inc., Microporcessor Burner Control Estro Series, Model 7500, 2005.
Recommended Buys, Philips Mini Jug HD 4399 reviews and best buys, at recommendedbuys.co.uk/household-appliances/kettles/philips-mini-jug-hd-4399.htm, 2 pages, obtained May 3, 2005.
SafetyCentral, 12 Volt Heated Thermos Plugs Into Auto Lighter Socket, at store.yahoo.com/safetycentral/12volheatthe.html, 1 page, obtained Jan. 15, 2005.
SafetyCentral, 12 Volt Heating Element/Auto Beverage heater Plugs into Cigarette Lighter Socket, at store.yahoo.com/safetycentral/12volheatelh.html, 1 page, obtained Jan. 15, 2005.
SafetyCentral, 12 volt Termos Auto Car Pot Makes Coffee/Tea/Soup & More, at store/yahoo.com/safetycentral/12volautcarp.html, 1 page, obtained Jan. 15, 2005.
Said, Carolyn, Old Age in the Technology Age, new Devices to Monitor health and Well-being at Home a Growing New Sector, at www.stgate.com/cgi-bin/article.cgi?file=/chronical/archive/2005/08/08/BUG7PE2H..., 6 pages, Aug. 8, 2005.
Sakura USA, Thermo Hot Water Pot, at www.sakurausa.com/thermohotwaterpothtm, 2 pages, Sakura obtained Jul. 25, 2005.
Sanyo, U-D22S, 3.0 Liter Micro-Computerized Electronic Jar Pot, at www.sanyo.com/applicances/small_appliances/indexcfm?productID=899, 1 page, Obtained Jul. 25, 2005.
Sanyo, U-D3OS, 3.0 Liter Micro-Computerized Electronic Jar Pot, at www.sanyo.com/appliances/small_appliances/indexcfm?productID=900, 1 page, obtained Jul. 25, 2005.
Sears, search for tea kettle, at www.sears.com/sr/javasr/search.do?BV_UseBVCookie=Yes&verticalFullName=&k..., 3 pages, obtained Jul. 10, 2005.
Shop.com, 2-1/2 Quart Cast Iron Tea Kettle, at amos.shop.com/amos/cc/main/catalog/pcd/10467516/prd/15998845/ccsyn/260/_x_/Plow..., obtained Jan. 8, 2005.
Shop.com, Braun Cordless Electric Water kettle, Model WK200, at amos.shop.com/amos/cc/pcd/10741922/prd/16569496/ccsyn/260, obtained Jan. 17, 2005.
Shop.com, Rosendahl Coffee Dispenser, item 24040, at amos.shop.com/amos/cc/main/ccn_search/st/rosendahl+coffee+dispenser/sy/product ..., obtained Jun. 12, 2005.
Shop.com, Search for Tea kettles, at www.shop.com/amos/cdmain/product_categories/act/0-20001-20154-22020/ccsyn/260/..., obtained Jan. 8, 2005.
Small Appliances, 110220 Volts, obtained Jul. 25, 2005.

Smarter, MicroInnovations MM710M, at www.smarter.com/specification/1209696-MIcro_Innovations_MM_710M_Micro_Boom ..., obtained Feb. 6, 2005.
Sundex corpoartion, No. CF-2700 Super Mini Gas Stove for Various uses, at www.asia.manufacturers.globalsources.com/gsol.GeneralManager?&design=clean&tan..., obtained Mar. 14, 2005.
Target, Panasonic Electric Thermo Pot, at www.target.com/gp/detail.html/602-6757377-3768623?asin=B0001ZPWE&&AFID=...., obtained Jul. 24, 2005,2 pages.
Target, search for tea kettle, at www.target.com/gp/search.htm/ref-sr_bx_1/601-7309644-4800933?field-keywords..., 4 pages, obtained Jul. 13, 2005.
Target, West Bend Electric Hot ppot, at www.target.com/gp/detail.html/sr=2-1/qid=1122301855/ref=sr_2_1/601-1831229-47..., 2 pages, obtained Jul. 25, 2005.
Verbatim Careers, Mrs Tea Two Coffee Teapot Tea Maker, at www.verbatimcareers.com/2004/mrs/tea/two/coffee/teapot/tea/maker/cls-2004/2063..., 1 page, obtained Jul. 29, 2005.
VoiceSignal, Voice Signal and Sunplus Announce Breakthrough Speech Recognition System for Interactive Toys, Aug. 22, 2000.
Walmart investor information, at investor.walmartstores.com/phoenix.zhtml?c=112761&p=irol-irhome, 5 pages, obtained Sep. 17, 2005.
Washing Machines, South Alabama Electric Cooperative, Inc., obtained Aug. 25, 2005.
West Bend Hot Pot, Instructions, obtained Jun. 31, 2005, 5 pages.
WestCoastMall, RPBH-012 12 Volt Beverage heater, at www.westcoastmall.net/shop/product_info.php?products_id-1593, obtained Jan. 15, 2005.
Zolirushi NS-ZcCC10 5-1/2- Cup Neuro Fuzzy Rice Cooker ans Warmer, at www.markcarey.com/shopping/p/B00007J5U7, 3 pages, obtained Aug. 18, 2005.
Zojirushi TH-CSCO8 Micom Soup Warmer, at www.markcarey.com/shopping/p/B00028X43U, 2 pages, obtained Aug. 18, 2005.
Militta Perfect Time Atomic clock, from http://store/adelinevolelcom/mept1b:html; 1 page, obtained Jan. 6, 2006.
Cuisinart, Grind & Brew Thermal 10-Cup Automatic Coffeemaker, DGB-600, Product description, 2002.
Arora Electric, Ltd., product listing, from www.aroraelectric.com/HS_Kettles.htm, 6 pages, obtained Nov. 20, 2005.
Wega Mlninova 2003 Installation Instructions, Dec. 8, 2005.
Russell Hobbs, Product listing, from http://www.russell-hobbs.com/tea.shtml, 4 pages, obtained Nov. 20, 2005.
Wall Kettles, hsdonline.co.uk shopping site, from www.hyglenesuppliesdirect.com/products/cat124-sub4, 15 pages, obtained Nov. 21, 2005.
Hyco, Manual fill boiling water unit, model code ASM15, operating instructions, from www.hycomanufacturing.co.uk/boilingwater.html, obtained Nov. 24, 2005.
Hyco Manufacturing Ltd Water Heating Accessory kit SF1, 1 page, undated.
Zojirushl, Micom electric dispensing pot, operating instructions, CD-LCC30/CD-LCC40/CD-LCC50, undated.
Eco Kettle by author Treehugger, pp. 4 of 4, obtained Jan. 30, 2007 http://www.treehugger.com/files/2006/01/eco_kettle_by_p_1.php.
Shark Innovation in appliances by Shark,p. 1of 1,obtained Jan. 17, 2007 http://proof.acclipseweb.co.nz/proof/ssm/index.cfm/SHARK_NZ/Kitchen/Sensor_Temp_Kettle.
Not so smart kettle misses the bus by Australian It News, pp. 4 of 4,obtianed Dec. 31, 2006 http://australianilnews.com.au/articles/0,7204,19645011Î 15419ˆ nbv 15309,00.html.
Tefal plans joint drive for kettle with Whittard or Chelsea by Brand republic, pp. 2 of 2,obtained Dec, 30, 2006 http://www.brandrepublic.com/login/News/471273/.
Tassomo instruction manual by Braun, pp. 8 of 8,obtained Nov. 6, 2006 http://tassimo.co.uk/tassimo/downloads/uken1/UK_User_Guide.pdf.
Put ready/When UR kettle on via SMS by Engadget, pp. 5 of 5,obtained Oct. 2, 2006 http://www.engadget.com/2005/10/10/put-the-readywhenur-kettle-on-via-sms/#comments.

Hot Water on demand by Coleman instruction manual model # 2300-700, pp. 12 of 12,obtained Dec. 15, 2006 http://www.coleman.com/coleman/images/pdf/2300-700.pdf.

Table Type Electric kettles by Cleveland Enodis, pp. 2 of 2,obtained Apr. 6, 2006 http://www.enodisusa.com/nafemcategory.asp?category=0156&sort=width.

Water Max WM-TR operation manual by Wells, pp. 20 of 20,obtained Feb. 11, 2006 http://www.wellsbloomfield.com/WELLS/products/Unique/pdf/705%20WM-TR%20OpM.pdf.

TDC Trade dated Nov. 27, 2003 Yasuda/ Hometek p. 6 of 7 obtained Mar. 2, 2007 http://www.tdctrade.com/imn/03112704/electrical048.htm.

Publication of Corresponding PCT Application WO 2006/101888 A3 with International Search Report dated Oct. 29, 2007.

International Preliminary Report on Patentability and Written Opinion dated Oct. 29, 2007 in International Application No. PCT/US2006/009297.

Hamilton Beach Temo—Microwave Oven Publication with standard buttons/ Obtained Aug. 2, 2006 www.hb-microwaves.com/index.php.

Hamilton Beach Set N Forget Slow Cooker Manual #33966 / Dated Jun. 8, 2006 / Obtained Sep. 28, 2007 15pgs http:// useandcares.hamiltonbeach.com/files/840161402.pdf.

Rival SCVI600BSS Crock Pot/ Dated 2006/ Obtained Oct. 4, 2007 Dated Aug. 22, 2006 1st 45 pages http://www.crock-pot.ca/manuals/CrockPot/SCVI600BSS-CN_English.pdf.

Philips HD4685/4686 Kettle Obtained Feb. 28, 2008 http://www.p4c.philips.com/files/h/hd4685_30/hd4685_30_dfu_deu.pdf 1st 16 Pages undated.

Kenwood UK Response Kettle Obtained Jan. 24, 2008 http://www.kenwoodworld.com/datasheets/SJM350--18266iss1%20SJM350%20English%20only%20-0.PDF 2 Pages undated.

Strix EKO2P Electronic Control Board Obtained Jan. 28, 2008 Dated Mar. 5, 2007 http://www.strix.com/product/ek02p_pcba_data.htm 2 pages.

Strix U67 5 Pole Electronic Control Obtained Jan. 28, 2008 Dated Mar. 5, 2007 http://www.strix.com/product/u67_data.htm 2 Pages.

Strix P76 5 Pole Cordless System Obtained Jan. 28, 2008 Dated Mar. 5, 2007 http://www.strix.com/product/p76_data.htm 2 Pages.

Article:Kenwood kettle changes color Ubergizmo dated Sep. 30,2007 obtained Mar. 11, 2008 http://www.ubergizmo.com/15/archives/2007/09/response_kettle_does_it_in_color.html.

Article: Philips Kettle Pure Essence Aving dated Feb. 4, 2008 obtained Mar. 11, 2008 4686 http://aving.net/usa/news/default.asp?mode=read&c_num=72012&C_Code=03&SP_Num=0.

Wizard Illuminated Cordless Kettle dated Aug. 30, 2007 Obtained Mar. 14, 2008 1st 11 pages http://www.presidentschoice.ca/docdownloads/gm_products/KETTLEmanual.pdf.

Watlow MiniChief 2000 Manual dated May 1997 Obtained Mar. 16, 2008 71 pageshttp://www.watlow.com/literature/prodtechinfo/files/controllers/mchse_a.pdf.

Georgia Power Article "Cooking" Kettles are High Production Illustrating Inner and Outer Shell Obtained Apr. 3, 2008 3 pages undated http://www.georgiapower.com/powerzone/Kettles.asp.

Westinghouse/ Salton Thermocolor Iron WST5017 Published Apr. 2006 Obtained Jan. 18, 2009.

Taylor Waterproof Thermocouple Thermometer Launch date Sep. 2005 Unknown Published date.

Breville BKE 820 XL Published Nov. 2008 Obtained Dec. 28, 2008.

Chefs Choice Model 688 Published Jan. 2009 Obtained Jan. 20, 2009.

Arrow Springs Model ASC/4A Temperature Controller Dated Dec. 1, 1998 Obtained Feb. 19, 2009 p. 2 Alternating Display of Actual and Desired (Set Point) Temperatures based on internal time clock—vs temperature rise.

\* cited by examiner

MULTI-FUNCTION LIQUID CONTAINER

This application claims the benefit of U.S. Provisional Application No. 60/661,910, filed Mar. 16, 2005; U.S. Provisional Application No. 60/667,770, filed Apr. 4, 2005; U.S. Provisional Application No. 60/679,976, filed May 12, 2005; and U.S. Provisional Application No. 60/715,567, filed Sep. 12, 2005, all of which are incorporated herein in their entireties.

TECHNICAL FIELD

Aspects of the present invention relate to a multi-function container and in particular to a multi-function container for characterizing properties of contents or heating or processing contents therein.

BACKGROUND

Heating fluids, foods or other contents, or identifying relevant characteristics of the contents has been problematic for many individuals. Traditionally, heating or cooking foods or fluids have been performed on a stovetop. The food or fluid is placed in a pot and the pot is placed on a burner on a stove. The stove is turned on such that a filament is heated. The pot, which is placed in contact with the filament, is heated accordingly. After the contents of the pot is heated sufficiently, the heat may be manually shut off. The stove may utilize electricity to heat a filament or may utilize gas. If gas is used, a flame is produced at a burner and the pot is placed on top of the flame. In this way, the flame heats the pot which in turn heats the contents of the pot.

However, an individual desiring to heat food or fluids must have a pot and a stove readily available. Because stoves are often large and cumbersome, it is often not convenient for an individual to heat the contents of the pot or container at locations other than the kitchen. For example, if the individual is traveling or is at a location lacking kitchen facilities, the individual may not be able to heat food or fluids.

Similarly, hot pots have been used in which the pot is connected to an electrical cord that powers the pot. An electrical plug attached to the electrical cord is plugged into a wall outlet to provide power to the hot pot. In this way, the hot pot may be electrically powered to heat the contents of the hot pot. No stove top is used for the hot pot. However, using a hot pot, an individual is unable to utilize a stove top in heating the food or fluids contained in the hot pot. Rather, the hot pot can only be heated through the attached electrical cord. In the event that the electrical cord is unavailable or if there is no available electrical outlet or source of electricity, the individual desiring heating of the contents of the hot pot would be unable to heat the contents as desired. If the individual wishes to use a stovetop to heat the contents of the hot pot, the individual must first transfer the contents to a non-electrically powered pot and heat the non-electrically powered pot on the stove top. This wastes time and resources and leads to frustration of the individual. In addition, a hot pot does not provide a means for controlling or setting the temperature of the contents of the hot pot. Thus, an individual is unable to regulate the temperature of the contents of the hot pot or obtain a desired temperature.

Also, the electric hot pot as well as a pot on a stovetop requires a high amount of power to heat contents. The electricity provided to the hot pot via electric current from a source of electricity can be very costly over time. Similarly, the electricity used to power a filament on a stove top or to provide gas to power a gas burner on a stove top is also very costly. This problem is compounded by the lack of the ability to control or set the desired temperature in the pot or stovetop. Because the user cannot set a desired temperature, the pot or stovetop continues to heat the contents even when a desired temperature is reached, thus wasting energy and increasing costs.

Thus, there exists a need for a cost-effective apparatus and method for heating liquids or foods such that power may be conserved. There is also a need for an apparatus for heating liquids or foods that can adapt to the needs of the user and to provide additional information pertaining to the heating process to the user.

SUMMARY

In one example of one aspect, a container is provided for processing contents contained in the container. For example, a kettle may be provided for heating fluids therein.

In another example, a command or other user input may be received by the container. For example, the input may be a voice command that can be recognized by a voice recognition device for controlling the container or the heating of the contents of the container. In another example, the container may include a sensor, such as a temperature or pressure sensor, for detecting a corresponding characteristic of the contents of the container. Based on the characteristic (e.g., temperature or pressure), the container may control the heating or other processing of the contents of the container.

Also, the container may or may not include an output to provide information on the contents of the container. For example, a display may be included for providing a temperature or pressure of the contents of the container. Alternatively, a speaker may or may not be provided for output voice-emulated output to provide information on a characteristic of the contents of the container.

Also, the container may or may not heat or process the contents of the container based on the characteristic detected or measured. For example, if the temperature of the contents of the container exceeds a predetermined level, the container may discontinue heating of the contents of the container. Also, the container may resume heating the contents of the container if the temperature drops below the desired predetermined level.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention. It is noted that various connections are set forth between elements in the following description. It is noted that these connections in general and, unless specified otherwise, may be direct or indirect and that this specification is not intended to be limiting in this respect.

In one example, a container is provided that is capable of heating fluids or foods. Also, pressure within the container may be measured within the interior of the container. In this way, the container may inform a user as to the pressure within the container so that the individual can alter the function of the container as necessary. Alternatively, the container may automatically perform functions responsive to the pressure and/or temperature within the container. The present invention is not limited to any particular type of container and includes any container that can hold contents. The contents of the container may be heated or may be otherwise processed. For example, the present invention includes a pot, a kettle, a washing machine, a hot water dispenser etc.

Figure 1:
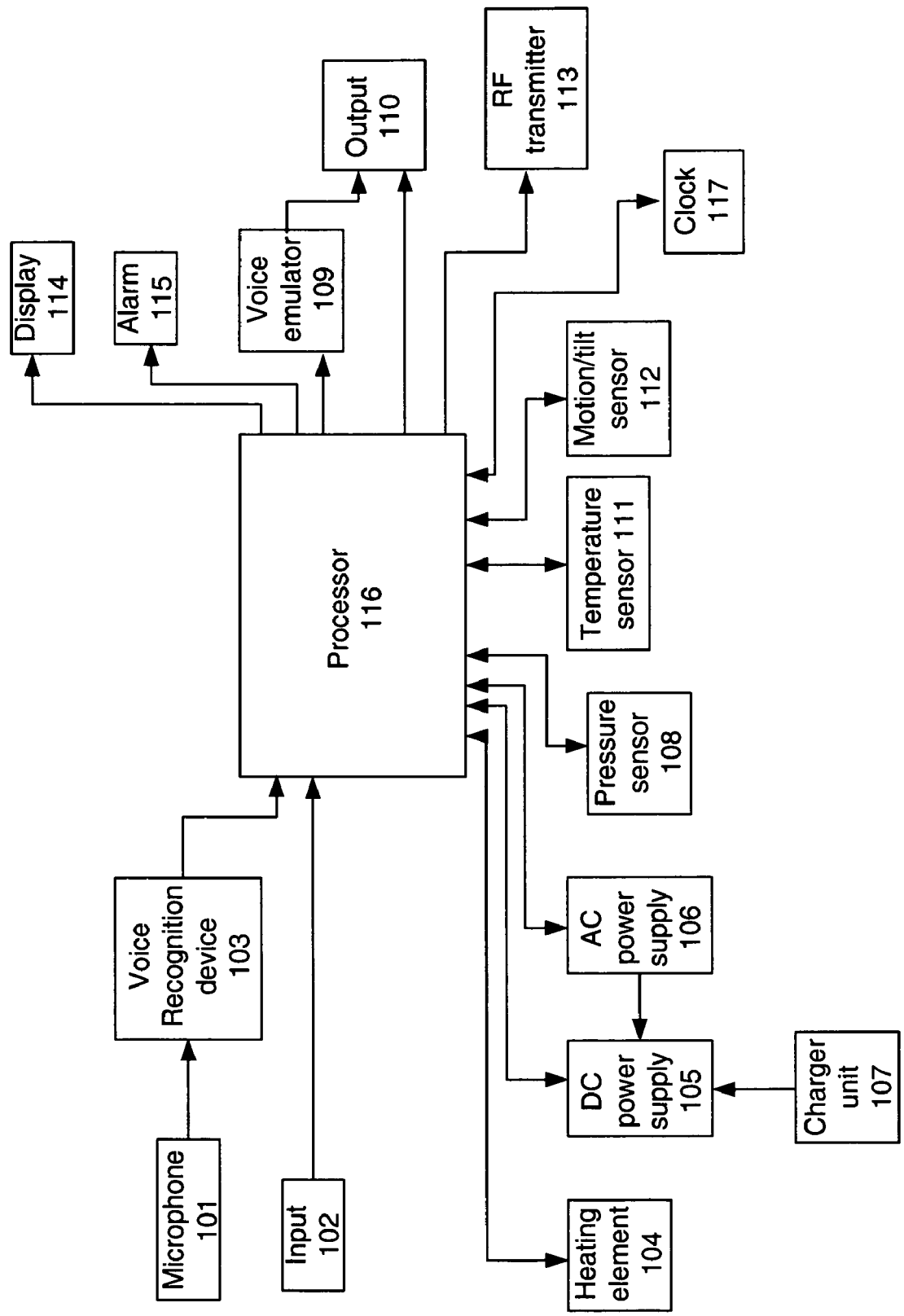
FIG. 1 is a block diagram of a suitable container in which one or more illustrative embodiments of the invention may be implemented.

FIG. 1 is a block diagram of a suitable container in which one or more illustrative embodiments of the invention may be implemented. Although one particular design is provided, functional blocks provided here may be combined, rearranged, separated, or even skipped. In this example, an input 102 may be provided in which settings and commands may be input to control the container. For example, a user may input a desired temperature to which to heat the contents of the container or a time for heating the contents of the container. Alternatively, a user may input voice commands through a microphone 101. The input voice commands may be recognized and converted by a voice recognition device 103. For example, a user may speak a desired temperature, pressure or time into the microphone 101. The input voice signals may be recognized by the voice recognition device 103 which may transmit the signals to a processor 116 for controlling the container accordingly.

In an example of the present invention, the processor may process the input signals, for example, the voice commands or other commands from a user. Based on the input signals, the processor may control a power supply to supply power to a heating element. In this example, a DC power supply 105 may provide power to heating element 104 so that the heating element 104 may heat the contents of the container. Alternatively, the processor 116 may control an AC power supply 106 to supply power to the heating element 104 to heat the contents of the container. In one example, the AC power supply 106 may be located underneath a base of the container to supply heat to the heating element 104. The heating element may also be located underneath the base of the container such that heat from the heating element may be transferred to a wall or base of the container and transferred to the contents of the container.

The AC power supply 106 may connect to an external power source such as an electrical wall outlet (not shown). The DC power supply 105 may be situated within the container, for example, in a handle of the container. The DC power supply 105 may be, for example, a battery which may be rechargeable. The battery may be recharged by the AC power supply 106. Alternatively, the DC power supply 105 may be charged by any external charger unit 107. One example of an external charger unit 107 is a solar charging unit in which solar panels are provided to receive light input and convert the light input to provide power to the battery (i.e., the DC power supply 105).

The container may further include a pressure sensor 108. The pressure sensor 108 may detect the internal pressure within the container. For example, the container may form an internal cavity in which contents may be placed. Depending on the conditions of the content of the container, the pressure may vary. This pressure may be detected by the pressure sensor 108. For example, if water is placed into the container, the pressure caused by the water within the container may be detected. If water is removed from the container, the pressure may be detected as returning to atmospheric pressure indicating that the container is substantially empty.

In an example of controlling the heating of contents of the container, the pressure sensor 108 may detect that the pressure has changed beyond a desired threshold. For instance, the pressure sensor 108 may detect that the pressure within the container is approximately atmospheric pressure. Based on this information, the processor 116 may control the heating element 104 to discontinue heating of the contents of the container. For example, the processor 116 may turn off the heating element 104 or the power supply (e.g., the DC power supply 105 or AC power supply 106). Thus, heating of the contents of the container may be disabled or discontinued when the pressure changes beyond a desired point.

In another example, the container may contain a temperature sensor 111 for detecting the temperature of the contents of the container. As the contents of the container is heated by the heating element 104 as powered by the DC power supply 105, the AC power supply 106, or an external power supply, the current temperature of the contents may be measured by the temperature sensor 111. Examples of the temperature sensor 111 include a thermostat or a thermistor. However, any device for measuring temperature may be used. Based on the temperature of the contents as detected and measured by the temperature sensor 111, the processor may further control the heating element or power supplies. For example, if the temperature exceeds a desired temperature, the temperature sensor 11 may send the current temperature to the processor 116 which may discontinue heating of the contents of the container by disabling the heating element 104 or power supply (e.g., DC power supply 105 or AC power supply 106).

In another example of the temperature sensor 111, a temperature probe may be included in the temperature sensor 111 that may be positioned in the container to measure the temperature. The temperature probe may further be connected either directly or indirectly to a processor 116 or to an alarm 115. For example, when a temperature reaches a particular desired level, the temperature probe may send the measured temperature to the processor 116 or alarm 115 such that the alarm may indicate the temperature to a user. Alternatively, the temperature may be displayed on a display 114 or output to the user via an output 110.

In another example, the container may include a motion sensor or tilt sensor. As illustrated in the block diagram of FIG. 1, a motion or tilt sensor 112 may detect motion of the container or if the container is tilted. Based on whether the container is detected as moving or tilting, for example, the processor can further control heating of the contents of the container. As one example, if the container is tilted, the tilt is detected by the motion/tilt sensor 112 and relayed to the processor. Based on the detection of the tilting of the container, the processor 116 can discontinue heating of the contents of the container by turning off the heating element 104. Alternatively to or in addition to turning off the heating element 104, the processor may also turn off the power supply (e.g., the DC power supply 105 or AC power supply 106). Thus, safety is maintained as the heat is discontinued with the container is moved or tilted.

The container may further include a display 114 for displaying desired information. As an example, a user may desire the contents of the container to be heated to a particular temperature. The user may input the desired temperature in the input 102 or, alternatively, speak the desired temperature into the microphone 101. The processor receives the input signal and controls a power supply (e.g., the DC power supply 105 or AC power supply 106) to supply power to a heating element 104. The heating element may provide heat to the contents of the container to heat the contents to the desired temperature. The temperature sensor 111 may detect the current temperature which may be processed by the processor 116. The current temperature may further be displayed on the display 114 such that the user may be informed of the present temperature of the contents.

In another example, the time necessary for heating the contents of the container to the desired temperature may be displayed on the display 114. As one non-limiting example, a user may place a certain amount of water into the container and may desire that the water be heated to a temperature of 95° C. The pressure sensor 108 may detect the pressure caused by the water in the container and the temperature sensor 111 may detect the temperature of the water. Based on the detected data, the display 114 may display the length of time necessary to heat the amount of water in the container from the current detected temperature to the desired temperature of 95° C. In addition, the display 114 may also display the time remaining to heat the water to the desired temperature. For example, if the water is being heated and the temperature of the contents of the container has increased, the container can further calculate the heating time remaining until the desired temperature is reached. This value may be displayed on the display 114.

In addition to displaying information on the display 114, information may be output via an alarm 115 or an output 110. In the example of an alarm 115, an alarm 115 is provided for providing an audible signal when a particular condition is met. For example, it may be desired to heat the contents of the container to a designated temperature. The temperature sensor 111 detects the temperature of the contents of the container as the contents are being heated by the heating element 104. When the contents of the container is heated to the designated temperature or when the temperature of the contents exceeds the designated temperature, the processor causes the alarm 115 to sound. This alerts the user that the desired temperature has been reached. Similarly, the alarm may alert the user when any desired condition is met. As additional non-limiting examples, the alarm 115 may alert a user when a desired pressure or time limit has been reached or exceeded.

The alarm 115 may provide a coded alarm such that the user may be informed of particular alarmed features of the container. For example, the alarm may provide a series of sounds, beeps or melodies to alert various conditions. As one example, the alarm 115 may provide a particular number of successive beeps to indicate that the contents of the container has reached a particular preset temperature or pressure.

Alternatively, information may be provided via an output 110. In one example, the processor may transmit a signal based on input from the temperature sensor 111, pressure sensor 108 or motion or tilt sensor 112 to a voice emulator 109. The voice emulator may convert the signal received from the processor 116 into a voice output signal that may be output via the output 110. As one example, the output 110 may be a speaker and the output may be in the form audible speech to report a desired condition. In another example in automatic or preset mode, the display 114 or 901 illuminates an actual liquid or actual food temperature received from the temperature probe 111 or temperature sensor 111 for a brief amount of time as preset internally on the temperature rise. For ex. a temperature rise could be preset internally within microprocessor 116 for every 1 degree, 5 degrees, 10 degrees, 15 degrees, 20 degrees or any infinite temperature rise intervals and subsequently illuminates an actual or probe temperature 111 or temperature sensor 111 temperature on display 114 or 901 and a manually set desired or target temperature on display 114 or 901. The actual measured temperature from the temperature probe or temperature sensor 111 and the desired or target temperature, probe temperature 111 or probe sensor 111 are repeatedly shown on the display 114 or 901 for short periods of time until the actual temperature of the liquid or food is equal to or greater than the desired or probe temperature 111. In addition in a preferred embodiment, the repeated display of the actual liquid or actual food temperature and the desired or probe temperature 111 or temperature sensor 111 are displayed on display 114 or 901 in any number of temperature rise intervals as such the interval indication for ex. of the actual and desired temperature will be displayed on display 114 or 901 automatically in any number of preset temperature rise intervals (a factor of time) preprogrammed within the microprocessor 116. In addition in automatic or preset mode interval temperature rise indication of the temperature of a food or liquid is indicated by a variety of displays such as LCD, LED, Fiber Optic, or any other light source or mechanical indicating devices known in the art and in the automatic or preset mode, interval alarming of a temperature rise corresponding with display and or indication as such are activated as preset within the microprocessor 116 or manually set.

In another example, the alarm 115 or output 110 may provide an indication of any number of intermediate temperature or pressure levels of the contents of the container or any desired alarm interval, such as a range of values of a specified characteristic to provide an alert or an alarm. For example, a user may input preset intervals of temperature, pressure of any other desired parameter in the input 102. The user may alternatively input voice commands via a microphone 101 which may be converted by a voice recognition device 103. Based on the input present intervals, the container may provide an indication at the designated intervals of the temperature, pressure, or other indicated parameter, such as an alarm interval. As an example, a user may input a temperature interval such that the alarm 115 may provide an alert each time the temperature of the contents of the container changes by the indicated temperature interval. If the user inputs a temperature of 10 degrees and a target temperature of 150 degrees, for example, then the alarm 115 or output 110 may provide an indication each time the temperature rises 10 degrees until the target temperature of 150 degrees is reached. Hence, in this example, an alarm interval may be specified as 10 degrees or any other interval.

In another example, the user may also provide a minimum temperature at which alerts are to begin. Thus, in this example, the alarm 115 or output 110 provides the alerts only after the specified minimum temperature is reached. The user may be alerted each time the temperature increases by a specified or predetermined alarm interval after the minimum temperature is reached.

Alternatively, a user may input temperatures at which an alert is desired. In one example, a user may wish to heat the contents of the container to a target temperature of 150 degrees and may also wish to be alerted when the temperature of the contents of the container reaches 110 degrees. In this example, the user may input the desired alert temperature (e.g., 110 degrees) such that when the contents of the container reaches 110 degrees, the alarm 115 or output 110 may provide an indication to the user. The indication may be, for example, a beep, sound, melody or voice-emulated signal, to name a few.

In another example, the container may include a clock 117. The clock 117 may be set by a user to any desired time such as the current time. Alternatively, the clock 117 may be an atomic clock that is set or preset by radio signals received (e.g., regarding the atomic clocks in Boulder, Colo.).

Figure 2:
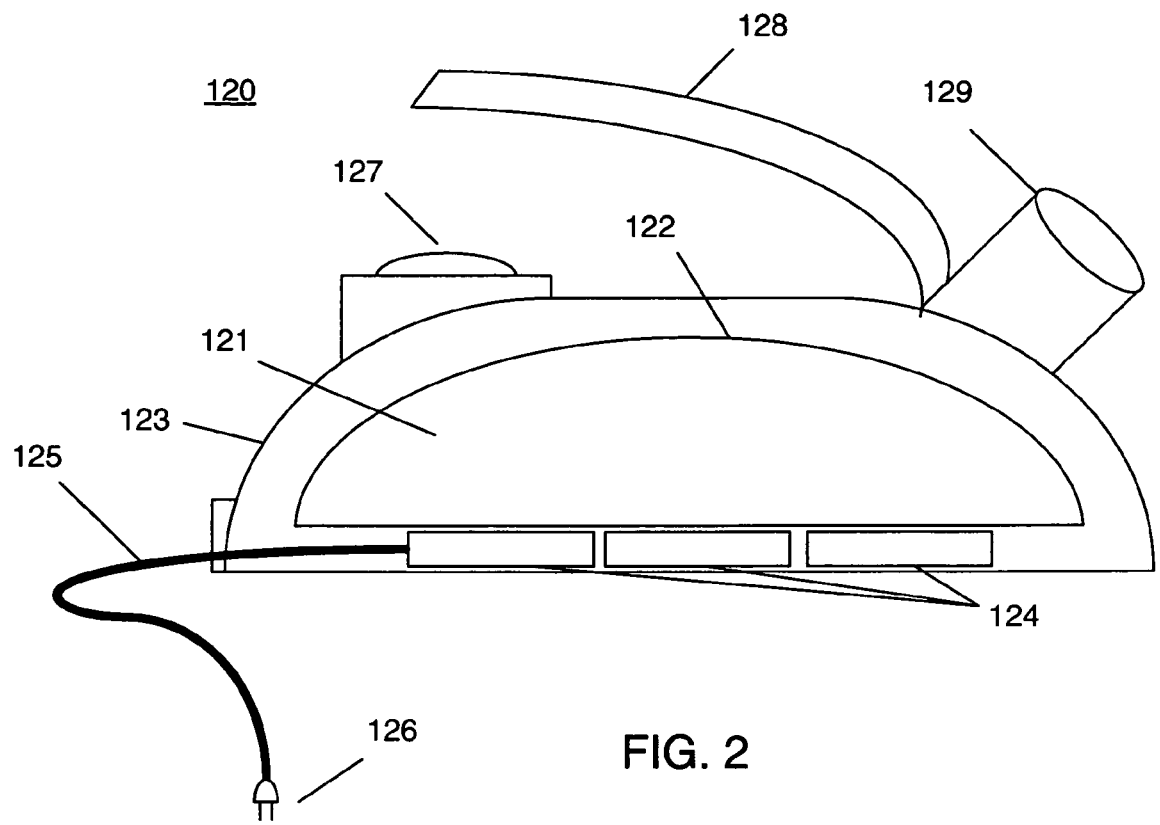
FIG. 2 is a diagram illustrating one example of a container of the present invention.

FIG. 2 is a diagram illustrating one example of a container of the present invention. In this example, the container is a kettle 120 for heating fluids within the interior of the kettle 120. Fluid or other material for heating is placed within an internal cavity 121 of the kettle 120 as illustrated in FIG. 2. The kettle 120 illustrated in FIG. 2 also contains a spout 129 through with the contents of the kettle 120 may be poured and a handle 128. Also, a fill cover 127 may be provided on the kettle through which fluid or other material may be added to the internal cavity 121 of the tea pot 120.

In this example, the kettle 120 also includes an outer surface 123 that surrounds the internal surface 122. To heat the contents of the kettle 120, at least one heating element 124 may be provided in the vicinity of the internal surface 122. In this example, the three heating elements 124 are provided under the base of the internal cavity 121. The base of the internal cavity 121 is formed by the internal surface 122 and is separated by the outer surface 123 by a space. The space may contain the heating element 124. In addition, any number of surface layers may be used. For example, another surface layer (not shown) may encompass the outer surface 123. By using additional layers, components within intervening spaces are further protected.

The at least one heating element 124 is attached to an electrical cord 125 through which current may pass to supply power to the at least one heating element 124. The electrical cord 125 may be plugged into an electrical outlet via a plug 126. The at least one heating element 124 responds to the power received through the electrical cord 125 to heat the adjacent internal surface 122 of the container. The heat from the internal surface 122 is transferred to the internal surface 122 and from the internal surface 122 to the contents of the kettle 120 within internal cavity 121 of the kettle 120.

The internal cavity 121 of the kettle 120 in this example is defined by an internal surface 122. The internal surface 122 may be made of any material such as metal or stainless steel. The internal surface 122 provides a surface which may cause the contents of the kettle to remain within the internal cavity 121 during processing.

The at least one heating element 124 may be, for example, an AC power supply for heating the contents of the kettle 120 response to receiving AC power. For example, water may be placed within the internal cavity 101 and can be heated to cause an increase in temperature of the water through heating by the at least one heating element 124. The heating element 124 may be located adjacent to the internal surface 122 as illustrated in FIG. 2. In one example, the heating element 124 is located adjacent to the internal surface 122 on the opposite side of the internal surface 122 as the contents within the internal cavity 121 of the kettle 120. In this example, the heating element 124 is physically separated and protected from the contents within the internal cavity 121 by the internal surface 122.

As set forth above, the heating elements may be an AC power supply. The AC power supply may be further connected to an electrical cord 125. The electrical cord 125 may include an electrical plug 126 for connecting to an external power source. As illustrated in the example of FIG. 2, an AC power supply may be located at the base of the kettle 100 under the internal surface 102. The AC power supply may be further attached to an electrical cord that may connect to an AC electrical outlet (not shown). Power may thus be supplied to the heating element 124 such that heating of the heating element 124 causes a corresponding heating of the internal surface 122 which causes the temperature of the contents within the internal cavity 121 to rise.

Figure 3:
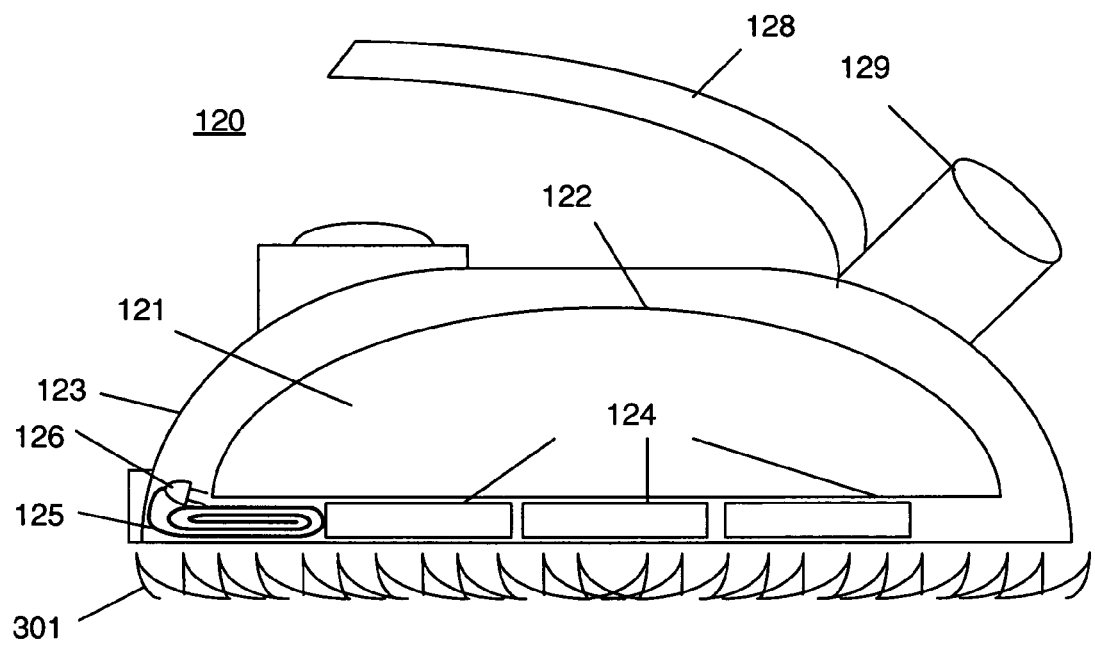
FIG. 3 illustrates another example of a kettle for heating contents in which an external heating source is applied.

In another example, the electrical cord 125 may be retractable or may be stored within a compartment of the container. As illustrated in the example of FIG. 3, an electrical cord 125 for supplying power to the heating elements of a kettle may be retracted into a compartment within the kettle. In this example, the compartment is between an internal surface 122 and an outer surface 123. The internal surface 122 contains the contents of the kettle 120. Hence the contents of the kettle 120 in this example contacts the internal surface 122 on the internal aspect of the internal surface 122. The outer surface 123 of the kettle 120 may encompass the internal surface 122 as illustrated in FIG. 3. A space is provided between the internal surface 122 and the outer surface 123 such that the heating element 124 may be situated between the internal surface 122 and the outer surface 123. In addition, the electrical cord 125 and electrical plug 126 may also be stored within the space between the internal surface 122 and the outer surface 123, if desired. For example, if the electrical cord 125 and/or electrical plug 126 is not being used, the electrical cord 125 and electrical plug 126 may be stored within the space between the internal surface 122 and the outer surface 123. In an alternative embodiment, the electrical cord 125 and/or electrical plug 126 is detachable and may be removed, if desired.

In another example, the container may be heated over a stovetop. For example, FIG. 3 illustrates a kettle 100 containing an inner cavity 121 surrounded by an internal surface 122. The internal surface 122 of the kettle 120 of this example is encompassed by an outer surface 125. A heating element 124 is also provided in this example between the internal surface 122 and the outer surface 123 which may be connected to an electrical cord 125. When the electrical cord 125 and electrical plug 126 is plugged into an AC power source or electrical outlet, power is provided to the heating element 124 via the electrical cord 125 to heat the heating element 124 and the adjoining contents of the kettle 120.

Also in this example, the kettle may be alternatively heated on a stovetop. For example, the electrical cord 125 and electrical plug 126 may be stored within the space between the internal surface 122 and the outer surface 123. The space between the internal surface 122 and the outer surface 123 may further be shielded such that if externally supplied heat is applied to the kettle 120, the electrical cord 125, electrical plug 126, and heating element 124 are sufficiently shielded from the supplied heat to protect the electrical cord 125, electrical plug 126, and heating element 124 from damage. For example, the outer surface may be made of a thermo-insulator material.

In one example of heating the contents of the container on a stovetop or other external heat source, the electrical cord 125 of the kettle 120 is retracted into the kettle 120. In this example, the electrical cord 125 is retracted such that the electrical cord 125 and electrical outlet 126 is stored in a space between the internal surface 122 and the outer surface 123. The kettle 100 in this example is placed onto a stovetop (or other external heat source) and may be heated by a gas flame 301. The external heat source (e.g., gas flame 301) provides heat to the outer surface 123 of the kettle 120 which is transferred to the inner surface 122 and subsequently to the contents of the kettle 120. The electrical cord 125 and electrical plug 126 is within the space between the internal surface 122 and the outer surface 123 and is protected from the externally applied heat (i.e., the gas flame 301, in this example).

Figure 4:
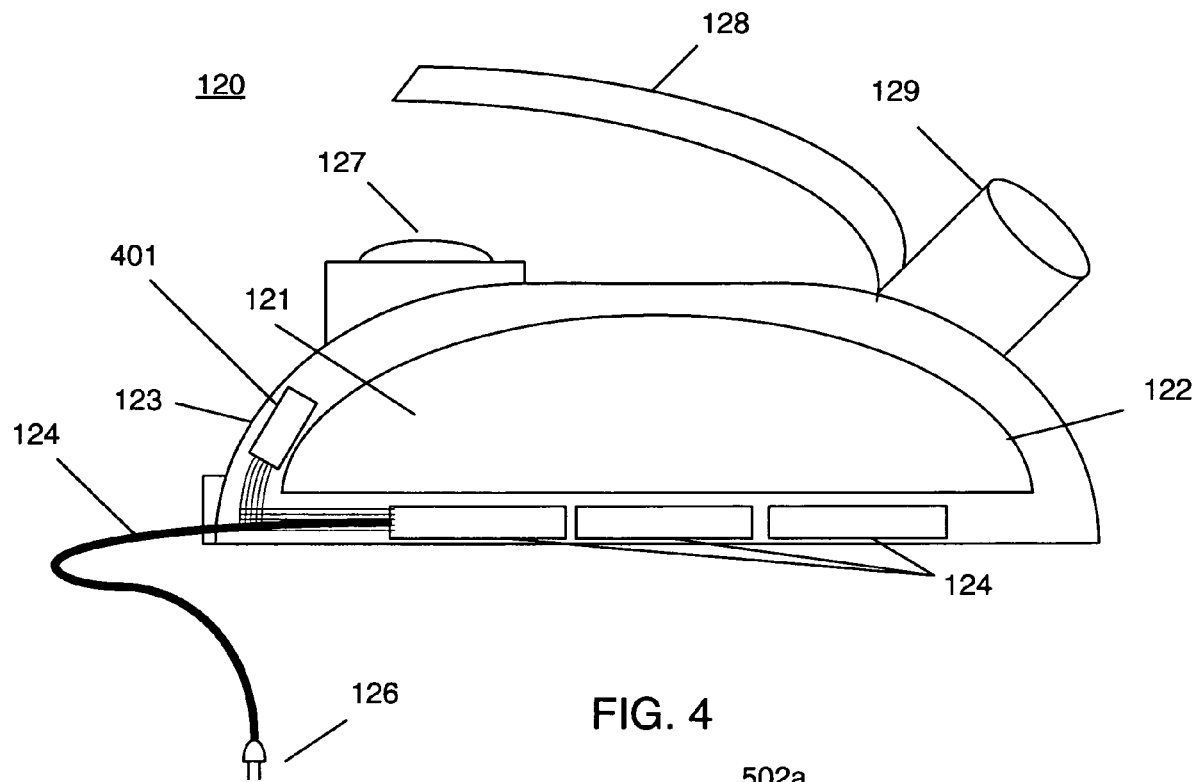
FIG. 4 illustrates another example of a kettle for heating contents with a DC power source.

In another example, the contents of the container may be heated through DC power. As FIG. 4 illustrates, the container (e.g., a kettle) may also contain a DC power source 401. In the example illustrated in FIG. 4, the DC power source 401 is within located in the space between the internal surface 122 and the outer surface 401. However, the DC power source 401 may be positioned in any convenient location, such as within the handle 128 of the kettle 120.

Figure 5:
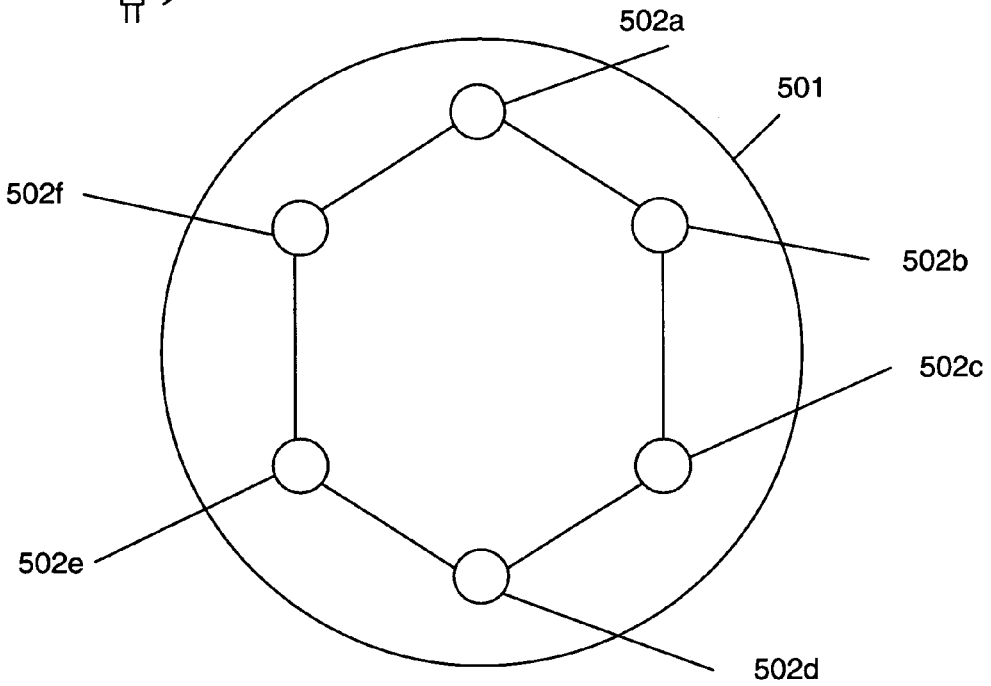
FIG. 5 illustrates an example of a DC power source according to at least some aspects of the present invention.

As the example of FIG. 4 illustrates, a kettle 120 may heat contents with a DC power source 401. In one example, the DC power source 401 may comprise a battery within a battery compartment in the kettle 120. The battery may provide power to heat the contents of the kettle 120 to a heating element. FIG. 5 illustrates an example of a DC power source 401 in which multiple heating elements 502a-502f provide heat to the contents of the kettle 120. Any number of heating elements 502a-f may be used in series or in parallel. The heating elements 502a-502f may be attached to a heating plate 501 for mounting the heating elements 502a-502f such that the heating elements 502a-502f may provide heat to the internal surface 122 of the kettle 120.

The temperature of the internal surface 122 of the kettle may rise from the heat supplied from the heating elements 502a-502f which may further heat the contents of the kettle 120.

Figure 6:
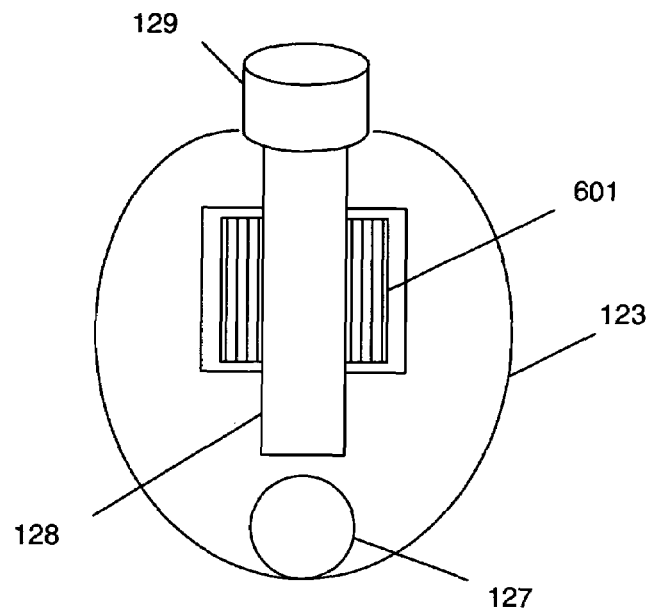
FIG. 6 is a top view of an example of a kettle according to at least some aspects of the present invention.

In another example, the battery is further coupled to a recharging unit. For example, the battery may be recharged via the AC power supply 106. In this example, the kettle 120 has an AC power supply 106 located, for example, in a space between an internal surface 122 and an outer surface 123 of the kettle 120. The AC power supply 106 may be coupled to the batteries such that the AC power supply 106 may supply power to the batteries to recharge the batteries. Alternatively, the batteries may be charged by any other charger unit 107 (see FIG. 1). For example, the kettle 120 may contain solar panels as the charger unit 107 such that light may be converted to energy for heating the contents of the kettle 120. In this example, at least one solar panel is connected to the battery such that light may be received through the solar panel and may be converted to energy which may be supplied to recharge the battery. FIG. 6 is a top view schematic diagram of a kettle 120 illustrating an example of a solar panel 601 on the kettle 120 for receiving light.

Figure 7:
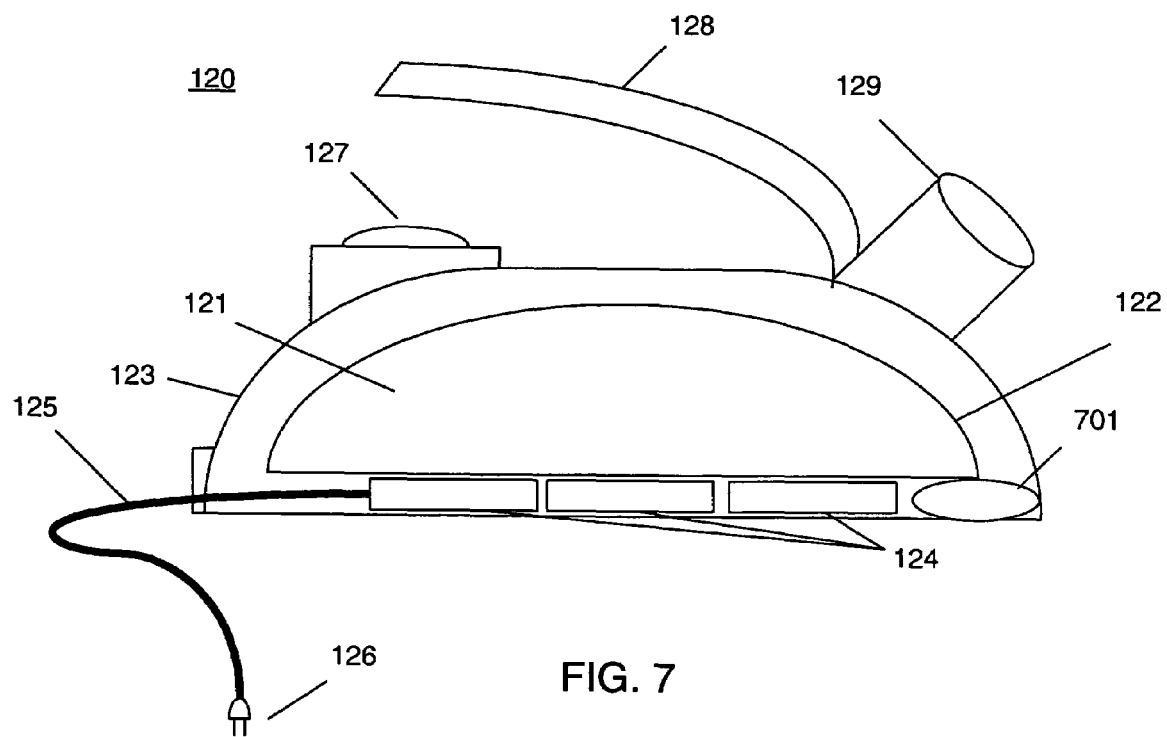
FIG. 7 illustrates another example of a kettle including a pressure sensor according to at least some aspects of the present invention.

In another example of one aspect of the present invention, the container may contain a pressure sensor 108 (see FIG. 1). The pressure sensor 108 may sense the pressure within the container so that the heating element 104 may heat the contents of container based on a pressure reading from the pressure sensor 108. FIG. 7 illustrates an example of detecting and measuring pressure within a container and heating the contents of the container based on the detecting and/or measuring of the pressure within the container. As FIG. 7 illustrates, the kettle 120 contains a pressure sensor 701 for detecting and measuring the pressure of the contents of the kettle 120. For example, water may be added into the internal cavity 121 of the kettle 120 via the fill cover 127. As the water is added to the internal cavity 121, the pressure sensor 701 may measure the pressure within the internal cavity 121. As more water is added to the internal cavity 121, the pressure increases. The pressure sensor 701 thus detects the rise in pressure within the internal cavity 121 of the kettle 120.

In one example, the pressure sensor 701 detects and measures the pressure within the internal cavity 121 of the kettle 120. When the pressure drops below a threshold value, the processor 116 shuts off the heating element 104. Alternatively, the processor 116 may shut off the power supply (e.g., the DC power supply 105 and/or the AC power supply 106). For example, if water is added to the internal cavity 121 and the DC power supply 105 or the AC power supply 106 powers the heating element 104 such that the heating element 104 raises the temperature of the water within the internal cavity so that the water boils, the water may continue to boil until the amount of water in the internal cavity 121 begins to decrease (i.e., the water may vaporize). As the amount of water in the internal cavity 121 decreases, the pressure within the internal cavity 121 decreases. Based on the pressure within the internal cavity 121, the processor 116 of the kettle 120 can control the heating of the water. For example, if pressure drops below a threshold value, then the heating is discontinued and the water stops boiling. This may prevent accidental boiling off of the water and possible subsequent damage to the kettle 120.

Figure 8:
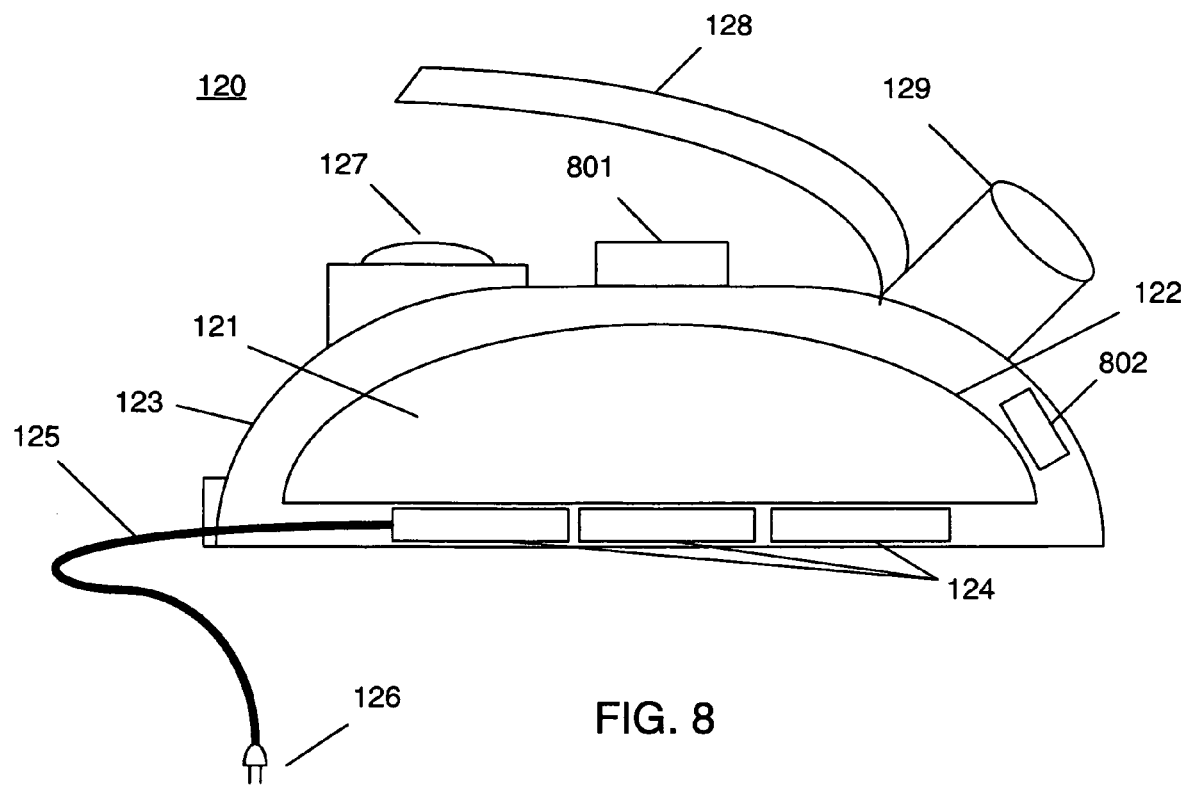
FIG. 8 illustrates another example of a kettle including an input for receiving commands or other input according to at least some aspects of the present invention.

In addition, commands or other input may be received by the container from a user. The container may control heating of the contents of the container based on the commands or input from the user. FIG. 8 illustrates an example of an input 801 for receiving commands or other input. Based on the input, the kettle 120 may control the heating of the contents within the internal cavity 121 of the kettle 120. In this example, a user may input data into the input 801. The input may include a desired pressure or temperature, for example. In one example, a user may input a desired temperature through the input 801 by, for example, inputting a value in a keypad. Alternatively, the kettle 120 may contain a voice recognition device 103 (see FIG. 1) and a microphone 101 such that the user can input an audio (i.e., spoken) command. In this example, the user may speak a desired temperature (e.g., "100 degrees") or range of temperatures (e.g., "between 100-110 degrees") into a microphone 101. The spoken input is recognized and interpreted by the voice recognition device 103. Based on the input, the processor 116 of the kettle 120 can control the heating of the contents within the internal cavity 121.

As an example to illustrate controlling the heating of contents of a container, FIG. 8 illustrates a temperature sensor 802 (see also FIG. 1) which may detect and/or measure the temperature of the contents of the internal cavity 121 of the kettle 120. A user may add, e.g., water into the internal cavity 121. Also, the user may input the desired temperature to which to heat the water. The user may input the desired temperature by speaking the desired temperature or temperature range into a microphone. A voice recognition device (see FIG. 1) can recognize the command. Based on the input, the processor 116 (see FIG. 1) can control the heating of the heating element 104.

In this example, the temperature sensor 802 senses the temperature is below the desired temperature as input via the input 801. The processor 116, responsive to the temperature of the water in the internal cavity 121 controls a power supply (e.g., DC power supply 105 or AC power supply 106) to power the heating element 104. The heating element 104 causes an increase in the temperature of the water in the internal cavity 121 of the kettle 120.

The temperature sensor 802 continues to monitor the temperature of the water in the internal cavity 121. When the temperature reaches the desired temperature or temperature range, the processor 116 discontinues the heating from the heating element 104. For example, the processor 116 may turn off the DC power supply 105 and/or the AC power supply 106 so that the heating element 104 stops heating the water in the internal cavity 121. If the temperature drops below the desired temperature (or drops out of the desired temperature range), the processor 116 may further turn the power supply (e.g., the DC power supply 105 or the AC power supply 106) to continue heating the contents of the internal cavity 121 via the heating element 104.

Figure 9:
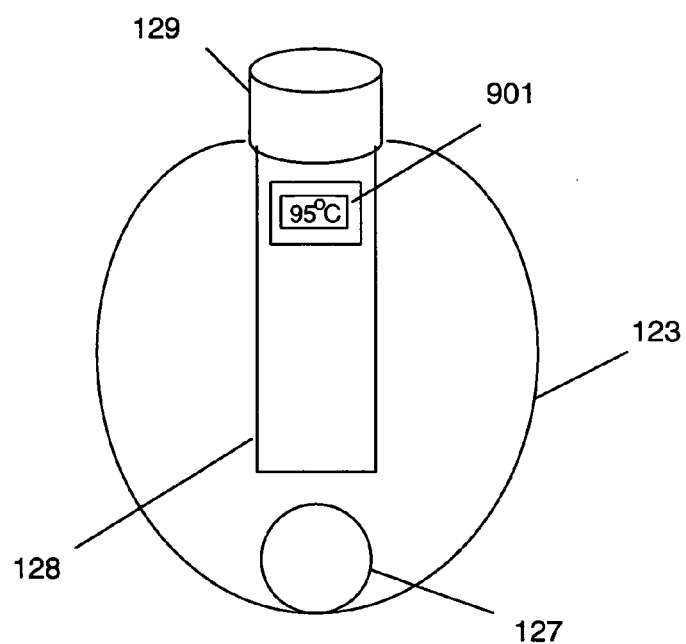
FIG. 9 is a top view of an example of a kettle with a display for providing information to a user according to at least some aspects of the present invention.

In another example, the container (e.g., a kettle) may include an output for providing information to a user. FIG. 9 is a top view of a kettle 120 containing a display for providing information to a user. In this example, the temperature sensor 111 of the kettle 120 detects the temperature of the contents of the kettle 120. The detected temperature is displayed on a display 901 to inform a user of the temperature. In this example, the display 901 displays the temperature of the contents of the kettle 120 in real-time. As the contents is heated, the temperature displayed changes in real-time to track the actual temperature of the contents.

Figure 10:
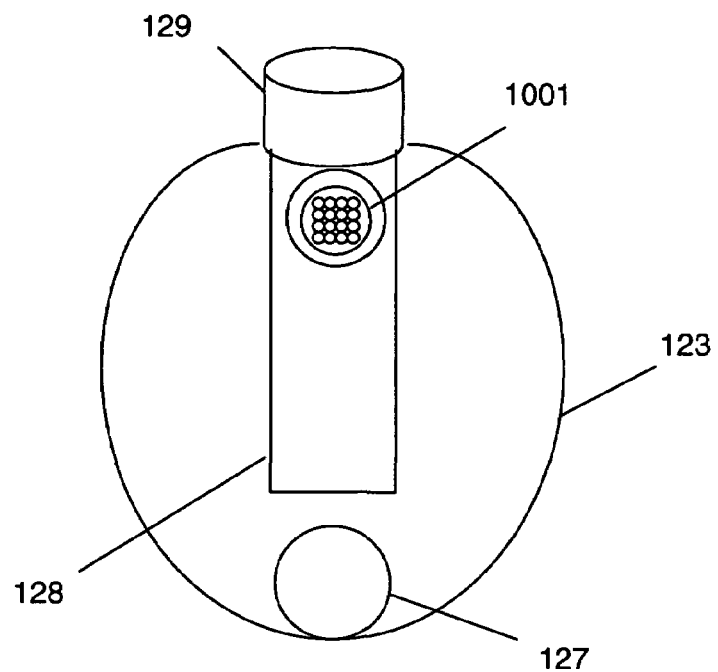
FIG. 10 is a top view of an example of a kettle with a data output device according to at least some aspects of the present invention.

In another example, a voice-emulator is provided in the container. FIG. 10 is a top view of a kettle 120 containing a voice-emulator and output 1001. The output 1001 in this example is a speaker for outputting a voice-emulated output to indicate the temperature of the contents of the kettle 120. The temperature sensor 111 detects and measures the temperature of the contents of the kettle 120 and transmits a corresponding signal to the processor 116. The processor 116 processes the detected temperature which is output to a voice emulator 109. The voice emulator 109 converts the signal to a voice-emulated output which is output via the speaker (i.e., the output 1001).

In addition, the kettle 120 may also contain an alarm 115 which may sound if a condition is met or if an undesired condition has occurred. For example, if the temperature reaches a desired level, the alarm may sound to indicate that the temperature has been reached. Also, if the pressure drops below a predetermined level, the alarm may sound to indicate that the contents of the kettle 120 has fallen below a threshold value or to indicate that the kettle 120 is empty.

Figure 11:
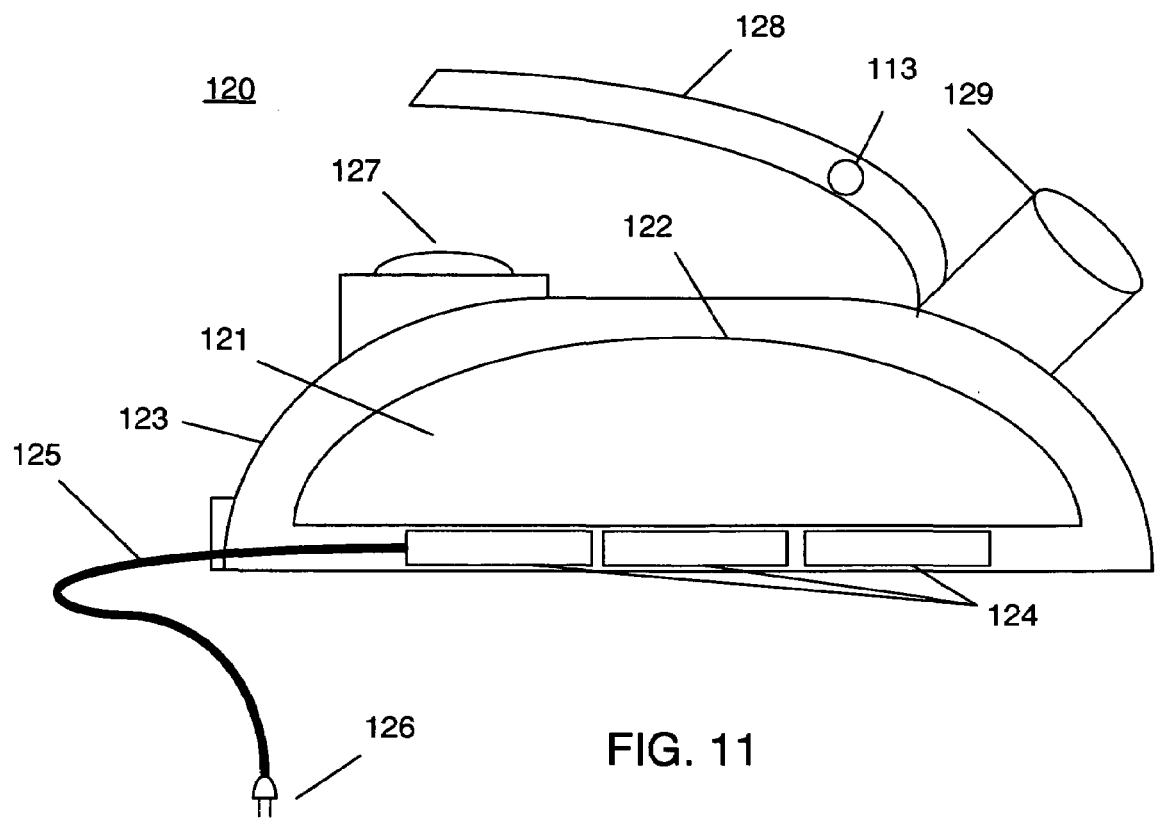
FIG. 11 is another example of a kettle with an RF transmitter according to at least some aspects of the present invention.

In another example, the container further includes an RF transmitter 113 (see FIG. 1). The RF transmitter may receive signals from the processor 116 of the container and transmit the signals to a remote destination wirelessly. As one example, the container may be a kettle 120 including the RF transmitter 113. FIG. 11 illustrates a kettle 120 for heating the contents within the internal cavity 121. The kettle 120 may contain an input 102 for receiving instructions from a user. Alternatively, the kettle 120 may contain a microphone 101 for receiving voice input and a voice recognition device 103 for processing of the voice input from a user for controlling the heating of the contents within the internal cavity 121. A processor 116 may further control the kettle 120 for heating the contents based on the input.

The kettle 120 may further include a temperature sensor 111 or pressure sensor 108 for detecting or monitoring the temperature or pressure within the internal cavity 121 of the kettle 120. Based on the temperature or pressure detected, the processor 116 may control a power supply (e.g., a DC power supply 105 or AC power supply 106 or external power supply (not shown)) to provide power to a heating element 104 (illustrated as elements 124 if FIG. 11). The heating element 104 may provide heat to the internal surface 122 which may further transfer the heat to the contents within the internal cavity 121.

When the temperature or pressure reaches a desired level, the processor may control the kettle 120 accordingly. For example, if a desired temperature is indicated and the desired temperature is reached, the processor 116 can display the temperature/pressure on the display 114, sound an alarm 115, provide a voice emulated output announcing the temperature/pressure or may transmit a command or signal via the RF transmitter 113. For example, the kettle 120 may transmit a control signal via the RF transmitter to a remote power or heat source to control the remote power or heat source. As one example, the kettle 120 and its contents are heated by on a flame of a gas stovetop. When a desired criteria is met (e.g., a desired temperature is reached), the processor 116 can send a command via the RF transmitter 113 to the gas stovetop to discontinue heating. The gas stovetop may turn off the flame responsive to the command received from the processor 116 of the kettle 120 via the RF transmitter.

Figure 12:
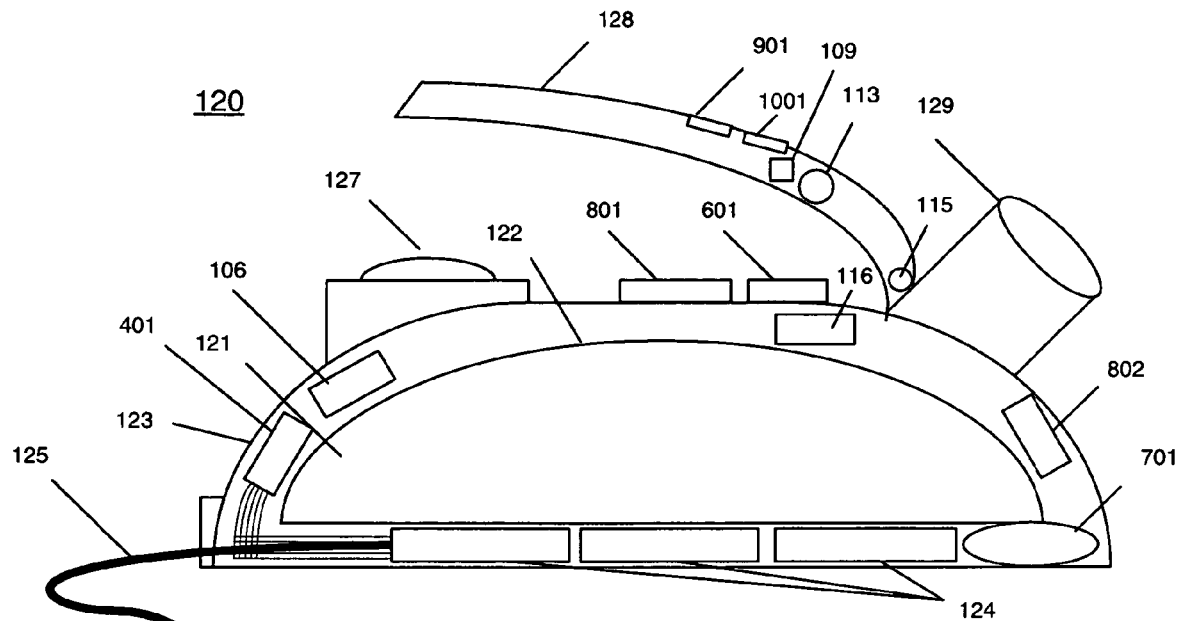
FIG. 12 is another example of a kettle according to at least some aspects of the present invention.

FIG. 12 illustrates a suitable container in which one or more illustrative embodiments of the invention may be implemented. Although one particular design is provided, functional blocks provided here may be combined, rearranged, separated, or even skipped. In this example, the container is a kettle for heating contents. The kettle includes an internal cavity 121 for holding the contents to be heated. The internal cavity 121 is formed in this example by an internal surface 122. An outer surface 123 is located external to the internal surface 122. Also, the kettle contains a fill cover 127 through which contents may be added into the internal cavity 121. The kettle 120 further contains a spout 129 that may be used to remove contents from the internal cavity 121 and a handle 128 for holding the kettle 120.

The kettle 120 in this example contains a processor 116. The processor 116 may control the kettle 120 or the heating of the contents of the kettle 120. For example, one or more heating elements 124 may be included for heating the contents. The at least one heating element 124 may be connected to an electrical cord 125 which may connect to an external power source through a plug 126. Thus, power may be input to the heating element 124 for heating the contents. The heating element 124 may further be controlled by the processor 116. Alternatively, the external power source may be a stovetop (not shown), for example, a gas stove top or gas flame for heating the contents of the kettle 120. In yet another example, power may be supplied via solar energy. In this example, solar energy is received via a solar panel 601 which may provide power to the heating element 124 based on the solar energy received through the solar panel 601.

Power to the heating element 124 may further be supplied by a power source within the container. For example, a DC power source 401 and/or an AC power source 106 may be included in the kettle 120 for providing power to the heating element 124 which may also be controlled by the processor 116.

The heating of the contents of the kettle 120 may be controlled by the processor such that any aspect of the heating may be regulated. For example, a user may input commands into the kettle 120 for controlling the heating of the contents. In one example, an input 801 is provided for receiving a command from an external source, such as a user, for regulating or controlling the heating of the contents of the kettle 120. As one example to illustrate, a user may input a desired temperature via the input 801 such that the kettle 120 may heat the contents of the kettle 120 to the desired temperature. In this example, the desired temperature is entered through input 801 and received at the processor 116. The processor may control the heating element and/or power source (e.g., DC power source 401 or AC power source 106) to heat the contents of the kettle 120 to the desired temperature.

The input 801 may also include a sound or audio input device such as a microphone for inputting sound commands. In this example, the input 801 may include a microphone for receiving audio commands. The audio commands may be a voice or spoken command. The voice or spoken command may further be recognized by the kettle 120 via a voice recognition device also included in the input 801. In this example, a voice command including the desired condition such as a desired temperature may be input via a microphone of the input 801 and may be recognized and/or converted to a form suitable for processing by the processor 116 by a voice recognition device in the input 801. Based on the input voice command, the processor may control the heating element 124 and/or power sources.

The kettle 120 may further include a temperature sensor 802 for measuring the temperature of the contents of the kettle 120. The temperature sensor 802 may further provide temperature information to the processor 116. Based on the temperature information, the processor may control the heating element 124 and/or power source such as the DC power source 401 or AC power source 106). For example, when the temperature of the contents of the kettle 120 is raised to the desired temperature, the temperature sensor 802 may detect the temperature of the contents and provide that temperature information to the processor 116. The processor may compare the measured temperature of the contents of the kettle 120 to the desired temperature. If the measured temperature is greater than or equal to the desired temperature, the processor controls the heating element 124 and/or power source to discontinue heating the contents of the kettle 120. If the temperature of the contents of the kettle 120 subsequently drops below the desired temperature, then the processor may turn on the heating element 124 or continue the power supply to the heating element 124 to continue heating of the contents of the kettle 120.

In another example, the kettle 120 may include an alarm 115, a display 901, or other output 1001. In the example described above, the alarm 115 may be activated when the contents of the container is heated to the desired temperature so that a user may be informed that the desired temperature is reached. This may occur, for example, in conjunction with the processor 116 turning off the heating element 124 and/or the power supply to the heating element 124. The alarm 115 may also indicate any desired condition. For example, the alarm 115 may also indicate that the temperature of the contents of the kettle 120 has dropped below the desired temperature. This may occur in conjunction with the processor 116 turning the heating element 124 on or turning on the power supply to the heating element 124.

The present invention is not limited to temperature sensing and regulation. Any parameter or condition may be monitored and regulated by the kettle 120 or the processor 116 of the kettle 120. For example, the kettle 120 may include a pressure sensor for sensing or detecting the pressure of the contents in the kettle 120. Likewise, a desired pressure may be received at the input 801. The processor 116 may control the processing or heating of the contents of the kettle 120 based on the desired pressure in a similar fashion.

A condition may also be displayed on a display 901. In this example, a display 901 may display desired information to a user such as the current temperature, target temperature, desired temperature, current pressure, desired pressure, etc. In another example, the display may include a clock (not shown) for providing a time. The clock may provide a current time, local time, global time, etc. and may also be an atomic clock. In this example, a signal may be received via the input 801 from a remote source indicating the time. The clock may display the time based on the signal received from the remote source.

In addition, the kettle 120 may also include an output for outputting relevant or desired information. For example, the output may be a speaker for outputting sound to notify a user of a condition. In one example, the output may include a speaker for providing a voice-emulated output. In addition, a voice emulator 109 may be operatively connected to the output for receiving an input signal from the processor 116 and converting the input signal to a voice output via voice emulation. In the example above, a desired temperature may be compared to a current temperature as detected by the temperature sensor 802. A corresponding signal is sent from the processor 116 to the voice emulator 109 which may convert the corresponding signal to a voice output for announcing the status of the contents of the kettle 120. For example, if the temperature of the contents is greater than or equal to the desired temperature, the output may provide a notification that the desired temperature is reached, for example, by an audio notification of "Your desired temperature has been achieved."

Also, the kettle 120 may include an RF transmitter 113 for transmitting a control signal to a remote device or remote heating source. For example, the RF transmitter 113 may control an external power supply or an external heat source based on the temperature or pressure of the contents of the kettle 120 such as turning on an external heat source (e.g., a gas stove) when needed.

Figure 13:
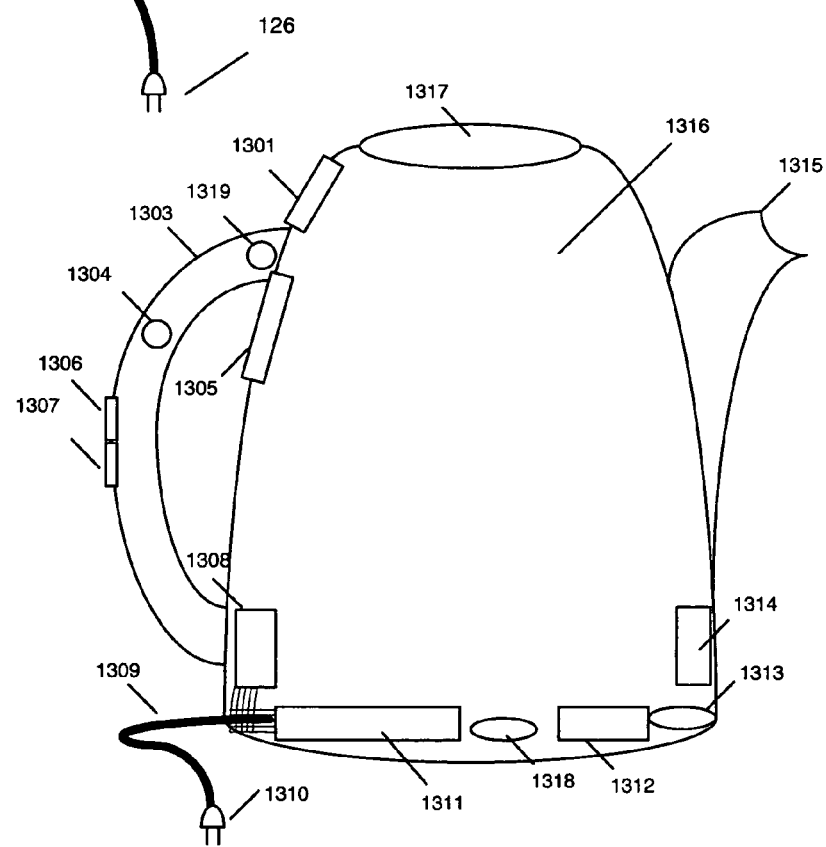
FIG. 13 is another example of a coffee dispenser according to at least some aspects of the present invention.

The present invention is not limited to the specific examples provided herein. The present invention may include any vessel containing contents for processing including, for example, coffee machines, kettles, washing machines, dishwashers, water coolers, etc. In one example, a coffee dispenser may be provided as illustrated in FIG. 13. In this example, the coffee dispenser 1300 may include an internal cavity 1316 for holding contents, a spout 1315 for pouring contents out of the internal cavity 1316, a fill cover 1317 for placing contents into the internal cavity 1316, and a handle 1303 for holding the coffee dispenser. The coffee dispenser may further include a processor 1312 for controlling a heating element 1311 and/or a power supply such as a DC power source 1308 or an AC power source 1318 for heating the contents of the coffee dispenser. Power may also be supplied by an external power source via a plug 1310 and electrical cord 1309. Alternatively, solar energy may be utilized via a solar panel 1301.

The heating of the contents of the coffee dispenser may be controlled by the processor 1312 based on, for example, input received via the input 1305. For example, a voice command indicating a desired temperature or pressure may be received at the input 1305. The voice command may further be converted to a signal recognizable to the processor via a voice recognition device (not shown). The processor may receive the converted signal and control the heating of the contents accordingly.

A temperature sensor 1314 and/or a pressure sensor 1313 may be included in the coffee dispenser 1300 for detecting the temperature or pressure, respectively. Based on the detected temperature or pressure (or any desired condition or parameter), the processor 116 may control heating of the contents. When a particular condition of interest is reached or lost, the condition may be provided to a user, for example, via an alarm 1319 or displayed on a display 1307. The display 1307 may further display any desired information including the time of day. In one example, the display includes a clock for providing a time such as a time of day or time for heating or heating time remaining. An output 1306 may also be included for providing a status of the contents of the coffee dispenser 1300. For example, the output 1306 may include a voice emulator for converting a signal into a voice output for providing desired information (e.g., temperature, pressure, notification of a condition reached or change of condition, etc.). The output 1306 may further include a speaker.

The coffee dispenser 1300 may further include an RF transmitter 1304 for controlling an external device or external heat source. For example, the RF transmitter 1304 may transmit a control signal to a stovetop or other heat source based on the present status of the contents. For example, if the temperature of the contents is greater than or equal to a desired temperature, the RF transmitter may transmit a control signal to a stovetop to discontinue heating.

In another example, the present invention may also include a washer which also contains contents (e.g., water, clothes, etc). In this example, the washer may contain an input 102 for receiving commands (e.g., temperature or pressure levels) and may control the operation of the washer based on desired criteria. In one example, a certain pressure may be desired (e.g., an amount of water) within the washer. Based on the amount of water (and pressure detected) within the washer, a processor 116 may control the washer accordingly (e.g., turn the washer on or off, start or stop filling the washer with water, begin a new cycle, etc.).

In another example, multiple readings may be taken (e.g., multiple pressure readings or temperature readings) over time and may be averaged together. The averaged value may be compared to a current value. When the averaged value and current value are within a predetermined threshold, the container (e.g., kettle 120) may correspondingly control the processing of the contents (e.g., may turn off the heat). In this way, boiling off of the water is prevented.

In another example, the inventive principles herein may further be embodied in a computer-readable medium. For example, in one example, a computer-readable medium containing computer-executable instructions for controlling the heating or processing of the contents is provided herein for implementing the present invention.

Figure 14:
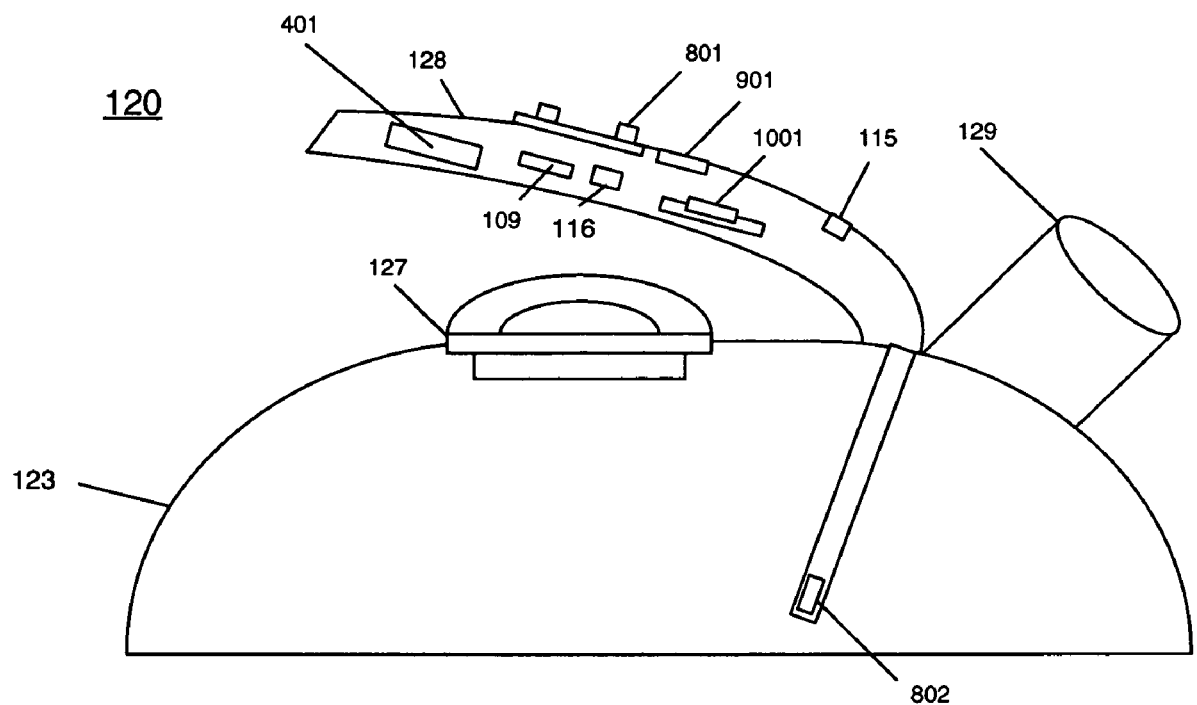
FIG. 14 is another example of a stove top kettle according to at least some aspects of the present invention.

In another example FIG. 14 illustrates a stove top kettle 123 single container in which one or more illustrative embodiments of the invention may be implemented wherein a DC power source 401 already disclosed for heating up contents within kettle 120, may be used for specifically supplying power to the various operational components of a stove top kettle 123 or coffee dispenser 1300 or any other container thus described within this embodiment.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. A container for heating contents, the container comprising:
   an internal cavity forming a concave internal cavity configured to receive the contents;
   an outer surface encompassing the internal surface;
   an electric heating element interposed between an internal surface and an outer surface;
   a connector configured to connect to a power source so as to provide power to the heating element;
   at least one of a temperature sensor configured to sense a temperature of the contents, a pressure sensor configured to sense a pressure within the internal cavity, and a motion sensor configured to sense a motion of the container;
   an input configured to receive a first command and a second command,
   a processor configured to set a desired temperature to which said contents are to be heated based on the first command, and said processor having two sets of instructions executable in at least one of two modes of operation, the instructions for the first preset mode instructing the processor to operate in a first preset display mode, said first preset display mode comprised of predetermined intervals display of the actual and desired temperature of the contents displayable upon at least one display, said processor being further configured to control the electric heating element based upon said first command and based upon at least one of a temperature of the contents, a pressure within the internal cavity, and a motion of the container, wherein instructions for the second mode instructing the processor to operate in a second manually selectable mode is separated by an interval display of the actual and desired temperatures as designated by the second command and displayable on at least one display; and
   an alarm with an indication of temperature is configured to be activated by said processor in accordance with one of said second mode having at least one of two or more alarms temperatures and two or more temperature indications separated by an interval;
   wherein the contents are capable of being heated by the electric heating element or an external heating source.

2. The container of claim 1 further comprising:
   at least one display, audio indicator, and preset controls,
   wherein the processor sets a desired temperature of the contents, such that a desired temperature of the contents is selectable.

3. The container of claim 1, said processor configured to keep contents warm.

4. The container of claim 1, wherein the container is configured to be heated via the external heat source wherein the external heat source is an external gas source.

5. The container of claim 1, wherein the processor is configured to output to a display at least one of a current time, a desired cook time, and end cook time and an elapsed cook time.

6. The container of claim 1, further comprising a probe in the internal cavity wherein the probe is configured to provide an actual temperature of the contents to the processor.

7. The container of claim 1, further comprising an alarm and temperature indication configured to be activated by said processor as instructed with the first preset mode instructions having at least one of two or more alarms temperatures separated by an interval and two or more indications of temperatures separated by an interval as part of said mode.

* * * * *